(12) United States Patent
Richardson

(10) Patent No.: US 10,814,684 B2
(45) Date of Patent: Oct. 27, 2020

(54) TIRE INFLATION SYSTEM

(71) Applicant: Aperia Technologies, Inc., Burlingame, CA (US)

(72) Inventor: Brandon Richardson, Burlingame, CA (US)

(73) Assignee: Aperia Technologies, Inc., Burlingame, CA (US)

( * ) Notice: Subject to any disclaimer, the term of this patent is extended or adjusted under 35 U.S.C. 154(b) by 245 days.

(21) Appl. No.: 16/161,771

(22) Filed: Oct. 16, 2018

(65) Prior Publication Data

US 2019/0047339 A1     Feb. 14, 2019

Related U.S. Application Data

(63) Continuation of application No. 15/280,737, filed on Sep. 29, 2016, now Pat. No. 10,144,254, which is a
(Continued)

(51) Int. Cl.
    *B60C 23/12*     (2006.01)
    *H02K 7/18*     (2006.01)
    (Continued)

(52) U.S. Cl.
    CPC .............. *B60C 23/12* (2013.01); *B60S 5/043* (2013.01); *F03G 7/08* (2013.01); *F04B 9/04* (2013.01);
    (Continued)

(58) Field of Classification Search
    CPC .. F04C 25/00; F04B 9/042; F04B 9/04; F04B 17/00; F04B 49/08; B60C 23/003; B60C 23/12; B60C 23/001; B60C 23/00; B60S 3/047; F16F 15/1485; F16H 25/08; Y10T 74/2128; Y10T 74/2107
See application file for complete search history.

(56) References Cited

U.S. PATENT DOCUMENTS

| 1,358,524 A | * | 11/1920 | Cooper | .................... B60C 23/12 152/421 |
| 1,448,248 A | * | 3/1923 | Anthony | .................. B60C 23/12 152/421 |

(Continued)

FOREIGN PATENT DOCUMENTS

| CA | 2440255 A1 | 3/2005 |
| CN | 2202665 Y | 7/1995 |

(Continued)

OTHER PUBLICATIONS

International Search Report and Written Opinion of the ISA for application No. PCT/US19/63088 dated Apr. 9, 2020.

*Primary Examiner* — Dominick L Plakkoottam
(74) *Attorney, Agent, or Firm* — Jeffrey Schox; Diana Lin

(57) ABSTRACT

A tire inflation system and method for a tire supported by a wheel, the tire inflation system including a pump system including a pump cavity configured to fluidly connect to the tire, an actuating element configured to actuate relative the pump cavity, a drive mechanism rotatably coupled to the wheel, the drive mechanism including a motion transformer and an eccentric mass, a valve fluidly connecting the pump cavity to a fluid reservoir; and a control system configured to operate the valve.

20 Claims, 8 Drawing Sheets

Related U.S. Application Data continuation-in-part of application No. 14/839,009, filed on Aug. 28, 2015, now abandoned, which is a continuation of application No. 14/198,967, filed on Mar. 6, 2014, now Pat. No. 9,039,386, which is a continuation of application No. 14/019,941, filed on Sep. 6, 2013, now Pat. No. 9,151,288, which is a continuation of application No. 13/797,826, filed on Mar. 12, 2013, now Pat. No. 9,039,392.

(60) Provisional application No. 62/235,121, filed on Sep. 30, 2015.

(51) Int. Cl.
| | | |
|---|---|---|
| *B60S 5/04* | (2006.01) | |
| *F03G 7/08* | (2006.01) | |
| *F04B 9/04* | (2006.01) | |
| *G05D 7/06* | (2006.01) | |
| *F17D 3/00* | (2006.01) | |
| *F16F 15/14* | (2006.01) | |
| *F04B 49/08* | (2006.01) | |
| *F04B 49/06* | (2006.01) | |
| *F04B 35/01* | (2006.01) | |
| *F04B 17/00* | (2006.01) | |
| *F04B 49/22* | (2006.01) | |

(52) U.S. Cl.
CPC ............. *F04B 9/042* (2013.01); *F04B 9/045* (2013.01); *F04B 17/00* (2013.01); *F04B 35/01* (2013.01); *F04B 49/06* (2013.01); *F04B 49/065* (2013.01); *F04B 49/08* (2013.01); *F04B 49/22* (2013.01); *F16F 15/1485* (2013.01); *F17D 3/00* (2013.01); *G05D 7/0617* (2013.01); *H02K 7/18* (2013.01); *H02K 7/1846* (2013.01); *Y10T 74/2107* (2015.01); *Y10T 74/2117* (2015.01); *Y10T 74/2128* (2015.01); *Y10T 137/86002* (2015.04)

(56) References Cited

U.S. PATENT DOCUMENTS

| | | | |
|---|---|---|---|
| 2,211,935 A | 8/1940 | Parker | |
| 2,415,618 A | 2/1947 | West | |
| 2,899,907 A | 8/1959 | Becher | |
| 2,962,119 A | 11/1960 | White | |
| 3,012,820 A | 12/1961 | King | |
| 3,047,339 A | 7/1962 | Hamer | |
| 3,152,553 A | 10/1964 | Sverker | |
| 3,175,507 A | 3/1965 | Sverker | |
| 3,249,059 A | 5/1966 | Renn | |
| 3,400,074 A | 9/1968 | Grenci | |
| 3,452,801 A * | 7/1969 | Fletcher | B60K 17/14 152/419 |
| 3,511,294 A | 5/1970 | Bepristis et al. | |
| 3,532,449 A | 10/1970 | Garton | |
| 3,730,215 A | 5/1973 | Conery et al. | |
| 3,886,974 A | 6/1975 | Bjorklund | |
| 3,981,633 A | 9/1976 | Wall | |
| 4,018,579 A | 4/1977 | Hofmann | |
| 4,030,300 A | 6/1977 | Thompson | |
| 4,095,923 A | 6/1978 | Cullis | |
| 4,121,472 A | 10/1978 | Vural et al. | |
| 4,157,530 A | 6/1979 | Merz | |
| 4,256,971 A | 3/1981 | Griffith | |
| 4,291,235 A | 9/1981 | Bergey et al. | |
| 4,370,894 A | 2/1983 | Sturesson | |
| 4,460,006 A | 7/1984 | Kolze | |
| 4,536,668 A | 8/1985 | Boyer | |
| 4,606,710 A | 8/1986 | Maguire | |
| 4,637,152 A | 1/1987 | Roy | |
| 4,651,792 A * | 3/1987 | Taylor | B60C 23/12 141/198 |
| 4,744,399 A | 5/1988 | Magnuson et al. | |
| 4,768,542 A | 9/1988 | Morris | |
| 4,807,487 A | 2/1989 | Seidl | |
| 4,819,593 A | 4/1989 | Bruener et al. | |
| 4,852,528 A | 8/1989 | Richeson et al. | |
| 4,893,459 A | 1/1990 | Orlando | |
| 4,895,199 A | 1/1990 | Magnuson et al. | |
| 4,910,148 A | 3/1990 | Sorensen et al. | |
| 4,922,984 A | 5/1990 | Dosjoub et al. | |
| 5,018,797 A | 5/1991 | Takata | |
| 5,052,456 A | 10/1991 | Dosjoub | |
| 5,173,038 A | 12/1992 | Hopfensperger et al. | |
| 5,201,968 A | 4/1993 | Renier | |
| 5,293,919 A | 3/1994 | Olney et al. | |
| 5,325,902 A * | 7/1994 | Loewe | B60C 23/004 152/418 |
| 5,342,177 A | 8/1994 | Cheng | |
| 5,370,711 A | 12/1994 | Audit et al. | |
| 5,375,984 A | 12/1994 | Wehling | |
| 5,388,470 A | 2/1995 | Marsh | |
| 5,409,049 A | 4/1995 | Renier | |
| 5,413,159 A * | 5/1995 | Olney | B60C 23/004 152/418 |
| 5,429,927 A | 7/1995 | Afseth et al. | |
| 5,468,129 A | 11/1995 | Sunden et al. | |
| 5,482,447 A | 1/1996 | Sunden et al. | |
| 5,495,879 A | 3/1996 | Cabestrero | |
| 5,512,439 A | 4/1996 | Hornes et al. | |
| 5,525,493 A | 6/1996 | Hornes et al. | |
| 5,538,062 A | 7/1996 | Stech | |
| 5,591,281 A * | 1/1997 | Loewe | B60C 23/12 152/418 |
| 5,646,727 A | 7/1997 | Hammer et al. | |
| 5,667,606 A | 9/1997 | Renier | |
| 5,707,215 A * | 1/1998 | Olney | B60C 23/12 152/418 |
| 5,759,820 A | 6/1998 | Hornes et al. | |
| 5,846,354 A * | 12/1998 | Winston | B60C 23/004 152/418 |
| 5,894,757 A | 4/1999 | Sully | |
| 5,941,692 A | 8/1999 | Olney et al. | |
| 5,941,696 A | 8/1999 | Fenstermacher et al. | |
| 5,947,696 A * | 9/1999 | Baumgarten | F04B 35/06 152/418 |
| 6,092,545 A | 7/2000 | Bedore et al. | |
| 6,144,295 A | 11/2000 | Adams et al. | |
| 6,267,450 B1 | 7/2001 | Gamble | |
| 6,360,768 B1 | 3/2002 | Galler | |
| 6,463,798 B2 | 10/2002 | Niekerk et al. | |
| 6,474,832 B2 | 11/2002 | Murray | |
| 6,482,592 B1 | 11/2002 | Lundeberg et al. | |
| 6,494,693 B1 | 12/2002 | Sunden | |
| 6,663,348 B2 | 12/2003 | Schwarz et al. | |
| 6,742,386 B1 | 6/2004 | Larson | |
| 6,744,356 B2 | 6/2004 | Hamilton et al. | |
| 6,787,233 B1 | 9/2004 | Molteberg et al. | |
| 6,814,547 B2 | 11/2004 | Childers et al. | |
| 6,871,683 B2 | 3/2005 | Cobb | |
| 6,984,702 B2 | 1/2006 | Fonnum et al. | |
| 6,986,913 B2 | 1/2006 | Fonnum et al. | |
| 6,994,136 B2 | 2/2006 | Stanczak | |
| 7,013,931 B2 * | 3/2006 | Toit | B60C 23/004 141/38 |
| 7,117,731 B2 | 10/2006 | Hrabal | |
| 7,160,707 B2 | 1/2007 | Fonnum et al. | |
| 7,173,124 B2 | 2/2007 | Deggerdal et al. | |
| 7,217,762 B1 | 5/2007 | Joergedal et al. | |
| 7,222,487 B1 | 5/2007 | Hinkley | |
| 7,225,845 B2 | 6/2007 | Ellmann | |
| 7,237,590 B2 | 7/2007 | Loewe | |
| 7,255,323 B1 | 8/2007 | Kadhim | |
| 7,357,164 B2 | 4/2008 | Loewe | |
| 7,498,683 B2 | 3/2009 | Landwehr | |
| 7,506,663 B2 | 3/2009 | Thomas et al. | |
| 7,581,576 B2 * | 9/2009 | Nakano | B60C 23/12 152/419 |

(56) References Cited

U.S. PATENT DOCUMENTS

| | | |
|---|---|---|
| 7,607,465 B2 | 10/2009 | Loewe |
| 7,614,474 B2 | 11/2009 | Yang |
| 7,625,189 B2 | 12/2009 | Cheng |
| 7,704,057 B2 | 4/2010 | Malbec et al. |
| 7,748,422 B2 | 7/2010 | Bol |
| 7,763,689 B2 | 7/2010 | Fonnum et al. |
| 7,784,513 B2 | 8/2010 | Loewe |
| 7,810,582 B2 | 10/2010 | Webb |
| 7,828,095 B2 | 11/2010 | Murata et al. |
| 7,828,101 B2 | 11/2010 | Radtke et al. |
| 7,847,421 B2 | 12/2010 | Gardner et al. |
| 7,856,871 B2 | 12/2010 | Mancosu et al. |
| 7,927,170 B2 | 4/2011 | Bickerton et al. |
| 7,931,061 B2 | 4/2011 | Gonska et al. |
| 7,931,817 B2 | 4/2011 | Bilski |
| 7,975,789 B2 | 7/2011 | Murata |
| 7,985,340 B2 | 7/2011 | Almaasbak et al. |
| 7,989,614 B2 | 8/2011 | Deggerdal et al. |
| 7,989,975 B2 | 8/2011 | Clement et al. |
| 8,004,104 B2 | 8/2011 | Hench |
| 8,022,561 B2 | 9/2011 | Ciglenec et al. |
| 8,038,987 B2 | 10/2011 | Fonnum et al. |
| 8,042,586 B2 | 10/2011 | Losey et al. |
| 8,083,503 B2 | 12/2011 | Voltenburg et al. |
| 8,110,351 B2 | 2/2012 | Bosnes |
| 8,113,254 B2 | 2/2012 | Benedict |
| 8,747,084 B2 | 6/2014 | Richardson et al. |
| 8,955,566 B2* | 2/2015 | Loewe .................. B60C 23/004 152/419 |
| 9,074,595 B2 | 7/2015 | Richardson |
| 9,145,887 B2* | 9/2015 | Richardson ............. F04B 17/00 |
| 9,151,288 B2 | 10/2015 | Richardson et al. |
| 2004/0050760 A1 | 3/2004 | Siegfriedsen |
| 2007/0018458 A1* | 1/2007 | Martinez ............ F03B 13/1885 290/53 |
| 2007/0040135 A1 | 2/2007 | Dyer et al. |
| 2007/0068238 A1 | 3/2007 | Wendte |
| 2007/0151648 A1 | 7/2007 | Loewe |
| 2008/0003110 A1 | 1/2008 | Isono |
| 2008/0190535 A1 | 8/2008 | Concu |
| 2008/0247883 A1 | 10/2008 | Yokomachi et al. |
| 2009/0048733 A1 | 2/2009 | Isono |
| 2009/0151835 A1 | 6/2009 | Manning |
| 2009/0301575 A1 | 12/2009 | Arnett |
| 2010/0243121 A1 | 9/2010 | Eigenbrode |
| 2011/0018275 A1* | 1/2011 | Sidenmark .......... F03B 13/1815 290/53 |
| 2011/0061621 A1 | 3/2011 | Finkenbiner |
| 2011/0203710 A1* | 8/2011 | Hinojosa, Jr. ........... B60C 23/04 152/419 |
| 2011/0308953 A1 | 12/2011 | Bazant et al. |
| 2012/0020822 A1* | 1/2012 | Richardson ......... F04B 43/1238 417/477.2 |
| 2013/0251553 A1* | 9/2013 | Richardson ........... B60C 23/001 417/321 |
| 2013/0276902 A1* | 10/2013 | Medley ................. B60C 23/003 137/12 |
| 2014/0023518 A1 | 1/2014 | O'Brien et al. |
| 2014/0186195 A1 | 7/2014 | Richardson et al. |
| 2015/0007920 A1* | 1/2015 | Tanno .................... B60B 19/08 152/416 |
| 2015/0239309 A1 | 8/2015 | Root |
| 2016/0008739 A1* | 1/2016 | Richardson ........... B60C 23/001 96/6 |
| 2017/0015159 A1 | 1/2017 | Richardson |
| 2018/0065429 A1 | 3/2018 | Richardson |
| 2018/0104994 A1 | 4/2018 | Lin et al. |

FOREIGN PATENT DOCUMENTS

| | | |
|---|---|---|
| CN | 2496691 Y | 6/2002 |
| CN | 101415946 A | 4/2009 |
| DE | 1042446 B | 10/1958 |
| DE | 19739144 A1 | 3/1999 |
| GB | 530005 A | 12/1940 |
| JP | 2005231573 A | 9/2005 |
| WO | 2009034321 A1 | 3/2009 |
| WO | 2009110001 A1 | 9/2009 |
| WO | 2012012617 A2 | 1/2012 |

* cited by examiner

TIRE INFLATION SYSTEM

CROSS-REFERENCE TO RELATED APPLICATIONS

This application is a continuation of U.S. application Ser. No. 15/280,737 filed 29 Sep. 2016, which is a continuation-in-part of U.S. application Ser. No. 14/839,009 filed 28 Aug. 2015, which is a continuation of U.S. application Ser. No. 14/198,967 filed 6 Mar. 2014, which is a continuation of U.S. application Ser. No. 14/019,941 filed 6 Sep. 2013, which is a continuation of U.S. application Ser. No. 13/797,826 filed 12 Mar. 2013, all of which are incorporated in their entireties by this reference. This application claims the benefit of U.S. Provisional Application No. 62/235,121 filed 30 Sep. 2015, which is incorporated in its entirety by this reference.

TECHNICAL FIELD

This invention relates generally to the pumping field, and more specifically to a new and useful tire inflation system in the pumping field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
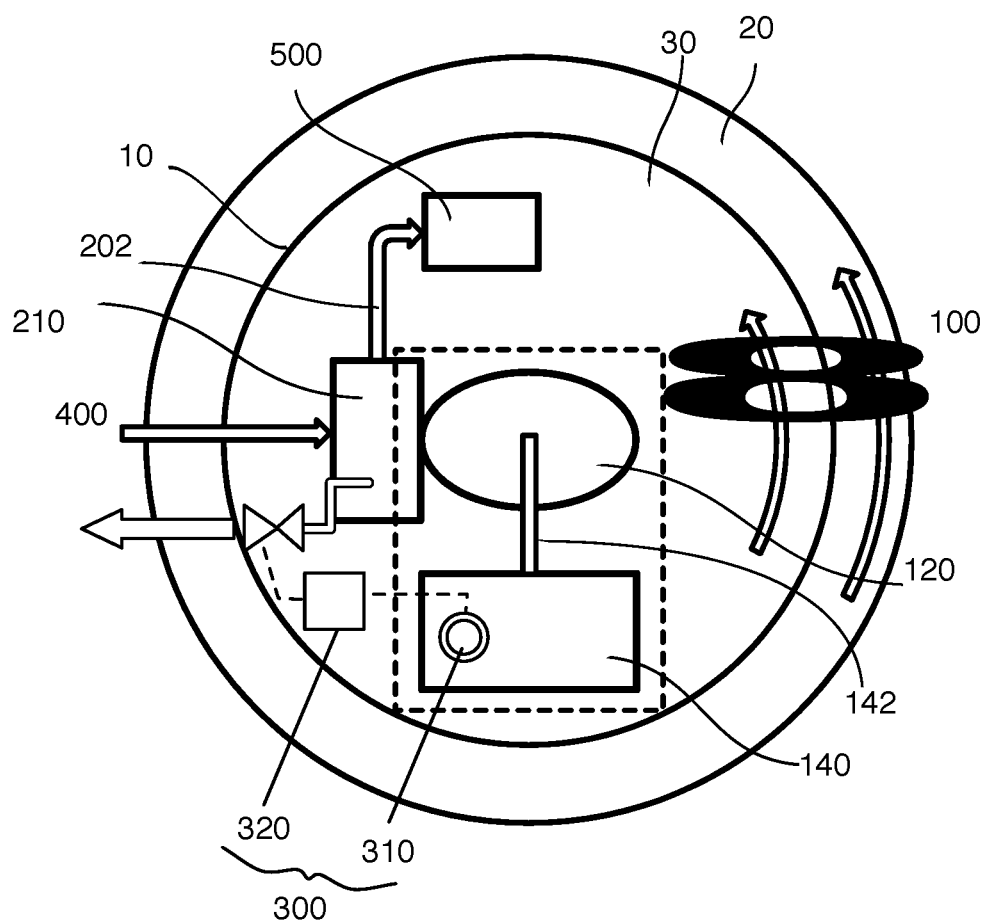
FIG. 1 is a schematic representation of the tire inflation system coupled to a rotating surface.

As shown in FIG. 1, a tire inflation system for a tire supported by a wheel includes: a pump system including a pump cavity configured to fluidly connect to the tire, an actuating element configured to actuate relative the pump cavity, a drive mechanism rotatably coupled to the wheel, the drive mechanism including a motion transformer and an eccentric mass, a valve fluidly connecting the pump cavity to a fluid reservoir, and a control system communicably coupled to the valve, and configured to operate the valve.

The tire inflation system functions to convert rotary motion (e.g., of a tire) into a pumping force. In one application, the inflation system can convert rotation of a rotating surface (e.g., a tire) into radial pumping force via relative motion between an eccentric mass (e.g., offset mass) and the rotating surface. The inflation systems and methods can additionally or alternatively automatically detect and mitigate eccentric mass spin, which can result from rotating surface rotation at or near a resonant frequency of the eccentric mass.

2. Benefits

The system and/or method can confer several benefits over conventional methodologies used for inflating tires. For example, conventional methodologies (e.g., manual tire inflation) can be expensive and inconvenient. In specific examples, the system and/or method can confer one or more of the following:

First, the technology can optimize the pressurization of tires. Underinflated tires can contribute to low fuel efficiency and other issues, which are particularly pronounced in the trucking industry, where long distances and large loads amplify the effects of an underinflated tire. In one application, the inflation technology can automatically pressurize tires through converting the rotation of a rotating surface (e.g., a tire) into radial pumping force via relative motion between an eccentric mass (e.g., offset mass) and the rotating surface.

Second, the technology can overcome issues arising from using the relative motion between an eccentric mass and a rotating surface to pump a tire. For example, the inflation technology can leverage stabilization mechanisms (e.g., fluid valves, clutches, eccentric mass-splitting, etc.) to compensate for back forces applied by the pump on the hanging eccentric mass (e.g., during a pump's recover stroke). Such back forces can disrupt the system in a manner that can adversely affect pumping power (e.g., exciting the eccentric mass in a manner that causes it to spin in a mass spin state). In examples with a reciprocating pump, the reciprocating pump can produce a back-torque during the compression stroke that can contribute to the eccentric mass approaching a mass spin state. Further, the reciprocating pump can produce an oscillation during pumping, which can excite the eccentric mass into a mass spin state (e.g., if the frequency of the oscillation is near the gravitationally-induced resonant frequency of the eccentric mass). These potential adverse effects can be particularly pronounced when the pump system rotates at or near the resonant frequency of the drive mechanism.

Third, the technology can actively actuate the stabilization mechanisms with precise timing and execution in order to minimize disruption of the tire pressurization by a mass spin state. The technology can leverage a control system (e.g., sensor set, processing system, power module, communications module, etc.) to measure parameters indicative of an mass spin state (e.g., using sensors), determine a mass spin state and/or state preceding an eccentric mass state (e.g., by processing the sensor data with the processing system), and alleviate the mass spin state (e.g., by actively actuating a stabilization mechanism into an alleviation mode). Further, in response to alleviation of the mass spin state, the technology can effectively transition the tire inflation system back into a normal tire inflating state (e.g., by actively actuating a stabilization mechanism into a recovery mode).

The technology can, however, provide any other suitable benefits in the context of automatic tire inflation.

3. System

As shown in FIG. 1, a tire inflation system 10 for a tire supported by a wheel includes: a pump system 15 including a pump cavity 210 configured to fluidly connect to the tire, an actuating element 220 configured to actuate relative the pump cavity 210, a drive mechanism rotatably coupled to the wheel, the drive mechanism including a motion transformer 120 and an eccentric mass 140, a valve fluidly connecting the pump cavity 210 to a fluid reservoir, and a control system 300 electrically connected to the valve, and configured to operate the valve. The tire inflation system 10 can additionally or alternatively include a housing 30 mountable to a surface of the wheel, a relief valve 135, and/or other suitable components.

3.1. Pump System

As shown in FIG. 1, the pump system 15 includes a primary pump 200 including a pump cavity 210, an actuating element 220, and a pump body 240; a drive mechanism 100 configured to drive the primary pump, the drive mechanism 100 optionally including a motion transformer 120 and an eccentric mass 140, and a drive mechanism couple coupling the drive mechanism 100 to the primary pump 200. The pump system 15 can optionally include a secondary pump 200b (e.g., substantially similar and mechanically connected to the primary pump, substantially different from the primary pump, etc.) and/or any number of pumps. The pump system 15 functions to translate rotational motion into a pumping force. In an embodiment, the pump system 15 is configured to translate relative motion between the primary pump 200 and the motion transformer 120 into a pumping force, where the eccentric mass 140 retains the motion transformer position relative to a gravity vector while the primary pump 200 rotates relative to the motion transformer 120 (e.g., with a rotating surface 20).

The pump system 15 is preferably couplable to a surface that rotates relative to a gravity vector, such as a rotating surface 20. The rotating surface 20 is preferably a wheel of a vehicle (e.g., a truck) but can alternatively be any suitable rotating system, such as a windmill, waterwheel, and/or any other suitable rotating surface 20.

The pump system 15 preferably receives fluid from a first reservoir 400 and pumps the fluid into a second reservoir 500. The fluid is preferably a gas (e.g., ambient air) but can alternatively be any suitable gas, a liquid, and/or any other suitable fluid. The first reservoir 400 is preferably the ambient environment, but can alternatively be a fluid source (e.g., a fluid canister), an intermediary reservoir, and/or any other suitable reservoir. The second reservoir 500 is preferably a tire interior, but can alternatively be any suitable reservoir. The pump system 15 can additionally or alternatively treat (e.g., filter) the pumped fluid within a suitable reservoir (e.g., intermediary reservoir) to remove debris, water, and/or or any other suitable undesired component of the fluid.

However, the pump system 15 can be configured in any suitable manner.

3.1.A. Primary Pump.

The primary pump 200 of the pump system 15 functions to pump fluid into the reservoir (e.g., a second reservoir 500), thereby pressurizing the reservoir. The primary pump 200 can include a pump cavity 210, an actuating element 220, and/or a pump body 240.

The primary pump 200 is preferably rotatably coupled to the rotational axis of the drive mechanism 100. The primary pump 200 is preferably positioned a radial distance away from the rotational axis of the drive mechanism 100, where the radial position of the primary pump 200 is preferably fixed, but can alternatively be adjustable. The primary pump 200 can be statically mounted to a housing 30 (where the housing 30 is statically coupled to the rotating surface 20) but can alternatively be transiently mounted to the housing 30 (adjustably mounted).

The primary pump 200 is preferably a positive displacement pump. In this embodiment, the actuating element 220 preferably forms a substantially fluid impermeable seal with the pump cavity 210, within which the actuating element 220 translates to create pressure differentials that move a fluid from the pump inlet to the pump outlet of the pump cavity 210. Positive displacement pumps can include any one or more of: a reciprocating pump (e.g., reciprocating piston pump), peristaltic pump, rotary pump, gear pump screw pump, progressing cavity pump, and/or any other suitable positive displacement pump. However, the primary pump 200 can be an impulse pump, velocity pump, gravity pump, steam pump, valveless pump, in-tire pump, and/or any other suitable pump type.

In a variation where the primary pump is a reciprocating pump, the pump cavity 210 is preferably a pump chamber and the actuating element 220 is preferably a reciprocating element. The reciprocating element can be a diaphragm, a piston, a diaphragm actuated by a piston (e.g., where the diaphragm defines the lumen and the piston receives the pumping force from the diaphragm to actuate the diaphragm, etc.), or any other suitable reciprocating element. The reciprocating pump preferably defines an actuation axis along which the reciprocating element travels during the compression stroke and/or the return stroke. The actuation axis is preferably substantially normal to the rotational axis, but can be at any suitable angle to the rotational axis. Additionally or alternatively, the reciprocating pump and/or other types of primary pumps 120 can include elements analogous to embodiments, variations, and examples described in Ser. No. 14/839,009 filed 28 Aug. 2015, which is herein incorporated in its entirety by this reference.

In a variation where the primary pump is a peristaltic pump, the pump cavity 210 is preferably a groove (e.g., circumferential groove) and the actuating element 220 is preferably a diaphragm or tube. Additionally or alternatively, the peristaltic pump and/or other types of primary pumps 120 can include elements analogous to embodiments, variations, and examples described in U.S. application Ser. No. 14/199,048 filed on 6 Mar. 2014, which is herein incorporated in its entirety by this reference.

However, the primary pump 200 can be otherwise configured.

3.1.A.i Pump Cavity.

The primary pump 200 can include a pump cavity 210 configured to fluidly connect to the rotating surface 20 (e.g., tire). The pump cavity 210 functions to facilitate fluid ingress (e.g., from the first reservoir) and/or fluid egress (e.g., into the second reservoir). The primary pump 200 can include any number of pump cavities (e.g., substantially different pump cavities, substantially similar, etc.).

A pump cavity 210 preferably defines at least one inlet and at least one outlet. Alternatively, the pump cavity 210 can define a fluid manifold that functions as both the inlet and outlet (e.g., a fluid manifold fluidly connected to the first and second reservoirs). Inlets and outlets are preferably defined through the walls of the pump body 240, but can alternatively be defined through the actuating element 220, through the junction between the pump body 240 and the actuating element 220, or defined in any other suitable portion of the primary pump 200. An inlet and outlet are preferably located on opposing walls (e.g., opposing walls extending from the closed end of the pump body 240), but can alternatively be adjacent on the same wall, be located on the closed end (e.g., of the pump body 240), or be located in any other suitable position. The inlet and outlet can define an inlet fluid path (e.g., through which fluid travels into the pump cavity 210) and outlet fluid path (e.g., through which fluid exits the pump cavity 210), respectively. The inlet and outlet fluid paths are preferably parallel, but can have any suitable relative angle. Additionally or alternatively, the fluid paths can be substantially normal to a radial vector extending from the rotational axis of the drive mechanism 100, but can otherwise be oriented.

The inlet and outlet of the pump cavity 210 preferably include inlet and outlet valves (e.g., passively controlled valves, actively controlled valves operable by the control system 300, etc.) that control fluid flow through the respective fluid channels.

However, the pump cavity 210 can be configured in any suitable manner.

3.1.A.ii Actuating Element.

The primary pump 200 can include an actuating element 220 configured to actuate relative the pump cavity 210. The actuating element 220 functions to receive the pumping force from the motion transformer 120 and to translate within the pump cavity 210, actuating relative to the pump body 240.

The actuating element 220 is preferably operable between a pumping mode and a non-pumping mode. In the pumping mode, the actuating element 220 receives a pumping force (e.g., from a drive mechanism 100) and translates between a compressed position and a recovered position. In the non-pumping mode, the actuating element 220 preferably does not receive a pumping force (e.g., from the drive mechanism 100) and fluid movement through the primary pump 200 is ceased and/or hindered. In a first variation, the actuating element can be operable in a pumping mode during operation of the stabilization mechanism 550 operation (e.g., in an alleviation mode, in a recovery mode). In a second variation, the primary pump can be configured to operate in a non-pumping mode in response to actuation of a stabilization mechanism 550 (e.g., for alleviating a mass spin state) and/or a pressure regulation mechanism (e.g., for regulating the pressure of the second reservoir), but can alternately operate in the non-pumping mode at any other suitable time.

In a variation where the primary pump is a reciprocating pump, the reciprocating element in the compressed position is preferably proximal the closed end of the pump cavity 210, and the reciprocating element in the recovered position is preferably distal the closed end of the pump body 240. In this variation, the transition of the reciprocal element from the compression position to the recovered position (e.g., during a return stroke) can cause a back force applied to the drive mechanism 100 that exacerbates the eccentric mass spin.

In a variation where the primary pump is a peristaltic pump, the rotary motion of a rotor that enables the transition between compressed and recovered positions can generate a force applied to a coupled drive mechanism 100 that exacerbates the eccentric mass spin.

However, the actuating element 220 can be configured in any suitable manner.

3.1.A.iii Pump Body.

The pump body 240 of the primary pump 200 functions to cooperatively compress a fluid with the actuating element 220. The pump body 240 preferably defines the pump cavity 210, but can additionally or alternatively define any suitable components. The pump body 240 is preferably an open pump body 240 with a closed end, where the pump body 240 preferably includes a closed end (bottom), walls extending from the closed end, and an opening opposing the closed end. The walls and ends can be any suitable geometry, and the walls (e.g., openings defined by the walls) can join the ends at any suitable angle. However, the pump body 240 can additionally or alternatively be otherwise configured.

The pump body 240 can be a groove defined in an arcuate or prismatic piece (e.g., in a longitudinal or lateral direction), a cylinder, a prism, or any other suitable shape. The pump body 240 is preferably substantially rigid, but can alternatively be flexible (e.g., when the primary pump is a peristaltic pump).

The pump body 240 is preferably oriented within the pump system 15 such that the closed end is substantially normal to a radial vector extending from the rotational axis of the drive mechanism 100 (e.g., the normal vector from the closed end is substantially parallel to the radial vector), but can alternatively be oriented with the closed end at an angle to the radial vector. The pump body 240 is preferably oriented with the opening proximal and the closed end distal the drive mechanism rotational axis (e.g., in variations where the primary pump 200 rotates about the motion transformer 120 exterior) but can alternatively be oriented with the opening distal and the closed end proximal the drive mechanism rotational axis (e.g., in variations where the primary pump 200 rotates about the motion transformer 120 interior), and/or oriented in any other suitable position relative to the drive mechanism rotational axis.

However, the pump body 240 can be configured in any suitable manner.

3.1.B Drive Mechanism

The drive mechanism 100 of the pump system 15 functions to generate the pumping force and to control the magnitude of the pumping force. The drive mechanism 100 preferably includes a motion transformer 120 and an eccentric mass 140, but can additionally or alternatively include any suitable element.

The pumping force (occluding force) is preferably a variable force applied in a radial direction from a rotational axis of the drive mechanism 100 (e.g., a cyclic force), but can alternatively be a constant force, a force applied at any suitable angle to the rotational axis, or any other suitable force. The drive mechanism 100 defines a rotational axis about which the drive mechanism 100 rotates relative to the primary pump 200 (conversely, about which the primary pump 200 rotates relative to the drive mechanism 100). For example, the drive mechanism 100 (e.g., a motion transformer 120 of the drive mechanism 100) can be rotatably coupled to the rotating surface 20 (e.g., mounted to a housing 30 mounted to a surface of the rotating surface 20) about the drive mechanism rotational axis. The rotational axis of the drive mechanism 100 is preferably the rotational axis of the motor transformer 120, but can alternatively be the rotational axis of the eccentric mass 140, the rotational axis about which the primary pump 200 rotates, and/or any other suitable rotational axis.

The pump system 15 is preferably configured such that the rotational axis of the drive mechanism 100 is substantially aligned with the rotational axis of the rotating surface 20 when the pump system 15 is coupled to the rotating surface 20, but the pump system 15 can alternatively be configured such that the rotational axis of the drive mechanism 100 is offset from the rotational axis of the rotating surface 20. The drive mechanism 100 preferably defines a drive mechanism center of mass, determined from the respective mass and positions of the motion transformer 120 and the eccentric mass 140. The eccentric mass 140 is preferably coupled to the motion transformer 120 such that the center of mass of the drive mechanism 100 is offset from the rotational axis of the drive mechanism 100.

However, the drive mechanism 100 can be configured in any suitable manner.

3.1.B.i Motion Transformer

As shown in FIG. 1, the drive mechanism 100 can include a motion transformer 120 mechanically coupled to the actuating element 220. The motion transformer 120 functions to convert rotary motion into linear motion for generating the pumping force for one or more pumps (e.g., primary pump, secondary pump, etc.). The motion transformer 120 can function to provide a substantially constant torque against the eccentric mass 140 throughout the compression stroke (e.g., in variations with a reciprocating pump), but can alternatively provide a variable torque against the eccentric mass throughout the compression or recovery strokes. The motion transformer can alternatively be omitted (e.g., in non-reciprocating embodiments).

The motion transformer 120 is preferably a cam, but can additionally or alternatively include cranks (e.g., slider cranks), screws (ball screws, roller screws, lead screw, etc.), scotch yokes, pulleys, swashplate, linkages, and/or other suitable motion transformers 120.

Figure 8A:
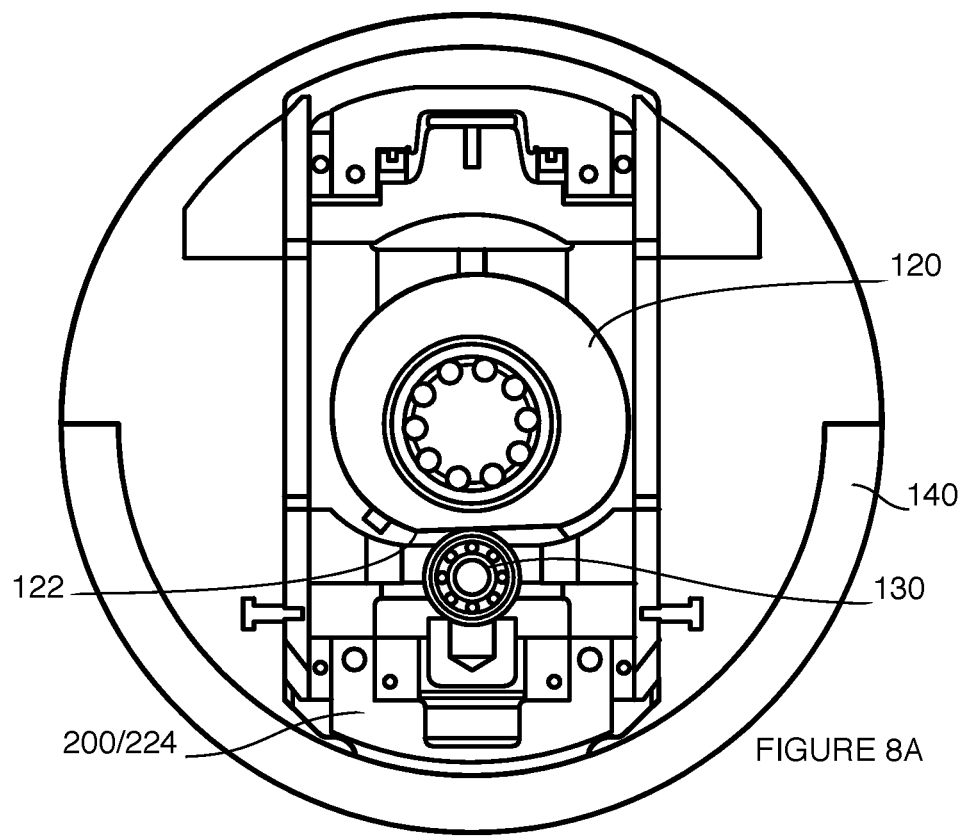
FIGS. 8A, 8B, and 8C are cutaway views of a variation of the tire inflation system in the recovery stroke, at the beginning of the compression stroke, and at the end of the compression stroke, respectively.
Figure 8B:
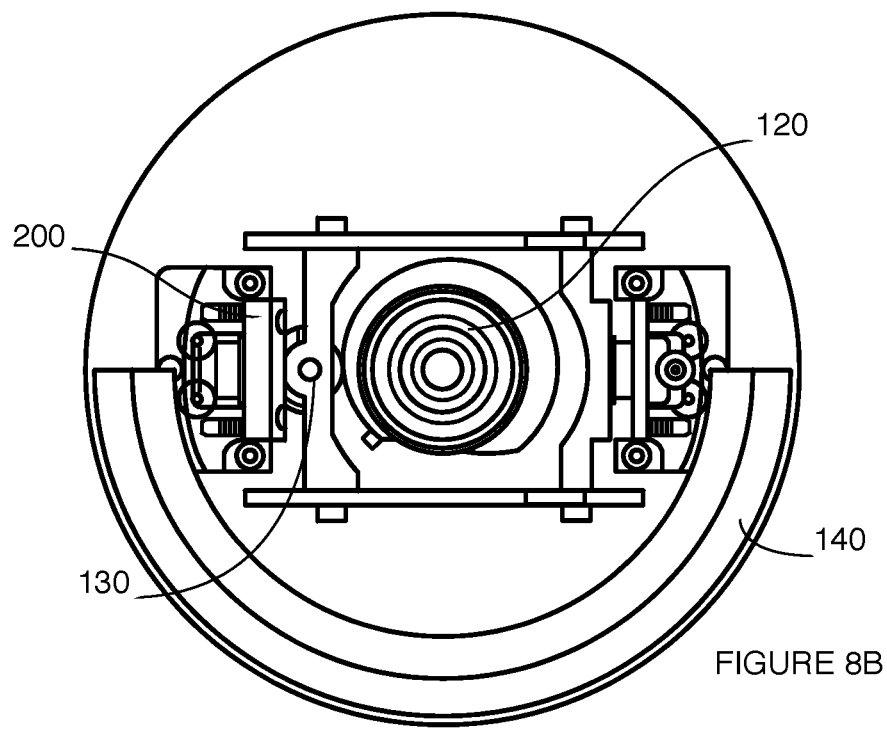
Figure 8C:
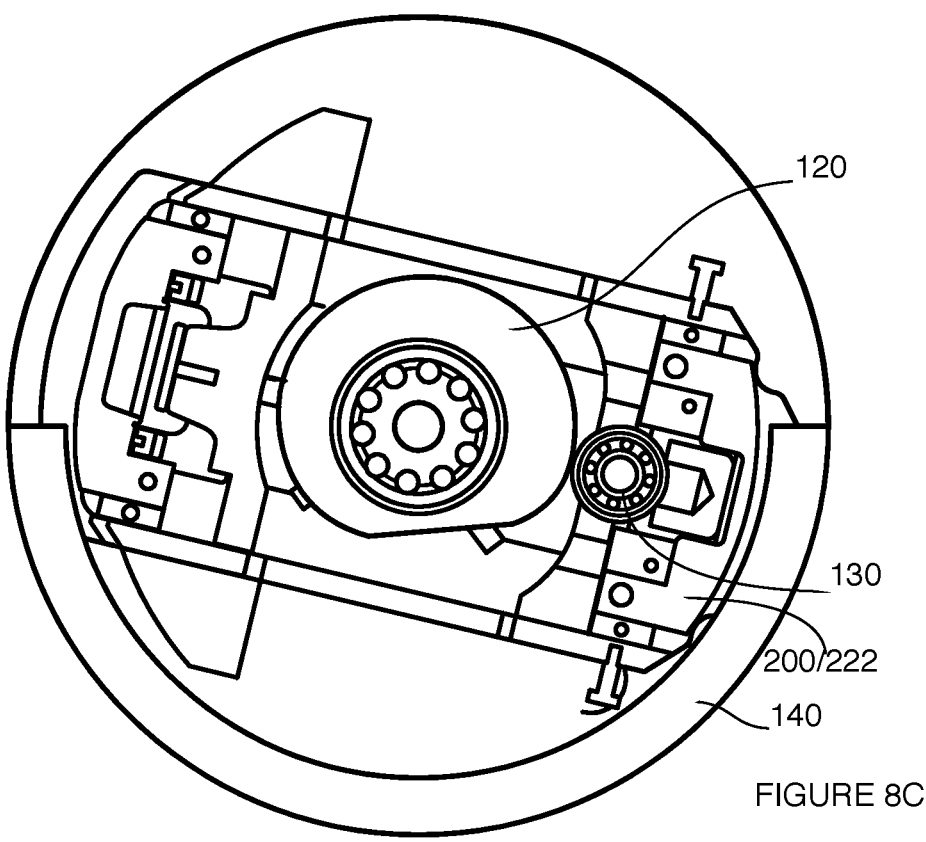

The motion transformer 120 preferably includes a bearing surface 122, where the profile of the bearing surface 122 preferably controls the magnitude of the pumping force for a given input torque applied by the eccentric mass 140 and/or the motion transformer 120. The bearing surface 122 is preferably continuous, but can alternatively be discontinuous. The bearing surface 122 is preferably defined on the exterior of the motion transformer 120 (exterior bearing surface or outer bearing surface) but can alternatively be defined within the interior of the motion transformer 120 (interior bearing surface or inner bearing surface), where the bearing surface 122 defines a lumen within the motion transformer 120. The bearing surface 122 is preferably arcuate, and preferably has a non-uniform curvature (e.g., an oblong profile or a reniform profile. Alternatively, the bearing surface 122 can have a uniform curvature (e.g., a circular profile), an angular profile, or any other suitable profile. As shown in FIGS. 8A-8C, the bearing surface 122 preferably includes a compression portion and a recovery portion, corresponding to the compression stroke and the recovery stroke of the primary pump 200), respectively. The compression portion is preferably continuous with the recovery section, but can alternatively be discontinuous. The bearing surface 122 preferably has a first section having a high curvature (preferably positive curvature or convex but alternatively negative curvature or concave) adjacent a second section having low curvature (e.g., substantially flat or having negative curvature compared to the first section). The bearing surface 122 preferably additionally includes a third section connecting the first and second sections, where the third section preferably provides a substantially smooth transition between the first and second sections by having a low curvature adjacent the first section and a high curvature adjacent the second section. However, the bearing surface 122 can have any suitable profile.

The motion transformer 120 is preferably substantially planar with the bearing surface 122 defined along the side of the motion transformer 120, in a plane normal to the rotational axis of the motion transformer 120 (e.g., normal the broad face of the motion transformer 120). The bearing surface 122 is preferably defined along the entirety of the motion transformer side, but can alternatively be defined along a portion of the motion transformer side. The generated pump force is preferably directed radially outward of the rotational axis, more preferably along a plane normal to the rotational axis. Alternatively, the motion transformer 120 can have a rounded or otherwise profiled edge segment (transition between the motion transformer broad face and the motion transformer side), where the bearing surface 122 can include the profiled edge. Alternatively, the arcuate surface is defined by a face of the motion transformer 120 parallel to the rotational axis of the motion transformer 120, where the generated pump force can be directed at any suitable angle relative to the rotational axis, varying from parallel to the rotational axis to normal to the rotational axis.

However, the motion transformer 120 can be configured in any suitable manner.

3.1.B.ii Eccentric Mass.

The eccentric mass 140 (e.g., hanging mass, hanging pendulum) of the drive mechanism 100 functions to offset the center of mass of the drive mechanism 100 from the rotational axis of the drive mechanism 100. This offset can function to substantially retain an angular position of the drive mechanism 100 relative to a gravity vector, thereby engendering relative motion between the drive mechanism 100 and the pump system components that are statically coupled to the rotating surface 20 (which rotates relative to the gravity vector). The eccentric mass 140 is preferably a substantially homogenous piece, but can alternatively be heterogeneous. The eccentric mass 140 is preferably a substantially singular piece, but can alternatively be made of multiple pieces or segments. In the latter variation, the multiple pieces are preferably substantially similar in shape, angular and radial position, and mass, but can alternatively be substantially different in profile, mass, angular position, or radial position. The eccentric mass 140 is preferably a distributed mass (e.g., extends along a substantial portion of an arc centered about the drive mechanism rotational axis), but can alternatively be a point mass. The distributed mass can result in higher rotational inertia and/or greater resistance to torque disturbances caused by a pump (e.g., primary pump 200), which can lead to increased stability and a longer time period before approaching a mass spin state. In certain applications, particularly those applications when wheel rotational speeds frequently approach the resonant frequency but alternatively any other application, the distributed mass can be preferable since the distributed mass results in low oscillation frequencies, thereby resulting in a lower likelihood of eccentric mass excitation into spinning with the system in response to a oscillation (e.g., linear or angular) introduced into the system (e.g., bumps, system pulsation, etc.). The eccentric mass 140 is preferably curved, but can alternatively be substantially flat, angled, or have other suitable shape. The radius of the eccentric mass curvature is preferably maximized (e.g., relative to or up to the pump system radius), such that the eccentric mass traces an arcuate section of the pump system perimeter. However, the eccentric mass 140 can have any other suitable curvature.

The eccentric mass 140 is preferably a separate piece from the motion transformer 120, and is preferably coupled to the motion transformer 120 by a mass couple 142. Alternatively, the eccentric mass 140 can be incorporated into the motion transformer 120, where the eccentric mass 140 is incorporated along the perimeter of the motion transformer 120, incorporated into a half of the motion transformer 120, or incorporated along any other suitable portion of the motion transformer 120. The eccentric mass 140 can be statically coupled to the motion transformer 120 or rotatably coupled to the motion transformer 120 (e.g., by a set of bearings, a rotary union, etc.). In the variation where the eccentric mass 140 is statically coupled to the motion transformer 120, the eccentric mass 140 can be coupled to the motion transformer 120 at the rotational axis of the motion transformer 120, at the rotational axis of the drive mechanism 100, offset from the rotational axis of the motion transformer 120, or at any other suitable portion of the motion transformer 120. The eccentric mass 140 can be permanently connected to the motion transformer 120. Alternatively, the eccentric mass 140 can be transiently connected (removably coupled) to the motion transformer 120 (e.g., by a clutch mechanism, ratcheting mechanism, etc.), where the eccentric mass 140 can be operable between a pumping mode where the eccentric mass 140 is coupled to the motion transformer 120 and a non-pumping mode where the eccentric mass 140 is disconnected from the motion transformer 120. The eccentric mass 140 preferably has a high moment of inertia, but can alternatively have a low moment of inertia.

The mass couple 142 is preferably a disk, but can alternatively be a lever arm, plate, or any other suitable connection. The mass couple 142 preferably couples to the broad face of the motion transformer 120, but can alternatively couple to the edge of the motion transformer 120, along the exterior bearing surface of the motion transformer 120, to the interior bearing surface of the motion transformer 120, to an axle extending from of the motion transformer 120 (where the motion transformer 120 can be statically fixed to or rotatably mounted to the axle), or to any other suitable portion of the motion transformer 120. The mass couple 142 can couple to the motion transformer 120 by friction, by a transient coupling mechanism (e.g., complimentary electric or permanent magnets located on the motion transformer 120 and mass couple 142, a piston, a pin and groove mechanism, etc.), by bearings, or by any other suitable coupling means. When the mass couple 142 couples to the motion transformer 120 by a transient coupling mechanism, the mass couple 142 is preferably operable between a coupled mode, where the mass couple 142 connects the eccentric mass 140 to the motion transformer 120, and a decoupled mode, where the mass couple 142 disconnects the eccentric mass 140 from the motion transformer 120. The mass couple 142 can additionally function as a shutoff mechanism, where the mass couple 142 is switched from the coupled mode to the decoupled mode in response to the detection of a shutoff event (e.g., the reservoir pressure reaching a threshold pressure). In one variation, the mass couple 142 is a disk located within the lumen defined by an interior bearing surface of the motion transformer 120, where the disk can rotate relative to the interior bearing surface in the decoupled mode and is coupled to the interior bearing surface by a friction element in the coupled mode. In another variation, the mass couple 142 is rotatably mounted on an axle extending from the motion transformer 120 by bearings, where the mass couple 142 can be statically coupled to the motion transformer 120 by one or more sets of magnets or pistons extending from the adjacent broad faces of the motion transformer 120 and mass couple 142.

However, the eccentric mass 140 and the mass couple 142 can be configured in any suitable manner.

3.1.C Motion Transformer Couple

The pump system 150 can include a motion transformer couple 130, which functions to connect the primary pump 200 (e.g., the actuating element 220 of the primary pump) to the drive mechanism 100 (e.g., the motion transformer 120 of the drive mechanism 100). The motion transformer couple 130 (e.g., force translator) can additionally or alternatively function to translate relative motion between the drive mechanism 100 and the primary pump 200 into a variable occluding force.

The motion transformer couple 130 is preferably a cam follower (e.g., a cam roller, cam bearing, etc.), but can additionally or alternatively be a keyed piece (e.g., tooth and gear complimentary pieces joining the drive mechanism 100 and the primary pump), linkage (e.g., rotatable linkage), and/or any suitable coupling mechanism.

The motion transformer couple 130 preferably applies a force in a radially outward direction from the rotational axis, but can alternatively apply a force in a radially inward direction, in a direction substantially parallel to the rotational axis, in a direction at an angle to the rotational axis, or in any other suitable direction. The motion transformer couple 130 preferably includes an axis having an arcuate position that is fixed relative to an arcuate position of the primary pump 200 (the angular position of the motion transformer couple 130 axis about the rotational axis is preferably fixed relative to the angular position of the primary pump 200). More preferably, the motion transformer couple 130 or a portion thereof has an angular position fixed to and substantially similar to the angular position of the primary pump 200 about the rotational axis, such that the motion transformer couple 130 travels with the primary pump 200 about the rotational axis.

The motion transformer couple 130 is preferably configured to travel along the arcuate bearing surface 122 of the motion transformer 120 (e.g., cam). The motion transformer couple 130 preferably maintains a substantially constant distance between the arcuate bearing surface 122 and the actuating element 220, such that the motion transformer couple 130 applies a variable force against the actuating element 220 as the motion transformer couple 130 travels along the variable curvature of the arcuate bearing surface 122 of the motion transformer 120. The motion transformer couple 130 is preferably in non-slip contact with the arcuate bearing surface 122, but can alternatively slide along the arcuate bearing surface 122. As such, the motion transformer 120 is preferably rotatably coupled to the bearing surface of the motion transfer. Further, the motion transformer couple 130 is preferably rotatably coupled to the actuating element 220, but can alternatively be otherwise coupled.

In a variation where the primary pump 200 is a reciprocating pump, the reciprocating element is a piston, and the motion transformer couple 130 is a roller, the reciprocating element 220 preferably rotatably connects to the roller at the rotational axis of the roller, but can connect to the roller with a semi-circular cup that cups the roller, or through any other suitable coupling mechanism. In a variation where the primary pump 200 is a reciprocating pump and the reciprocating element is a diaphragm, the reciprocating element 220 can directly contact the diaphragm, couple to the diaphragm through a piston, or couple to the diaphragm in any other suitable manner.

In a variation, the primary pump 200 can be a peristaltic pump and the motion transformer couple 130 can be a planetary roller that rolls about an interior or exterior arcuate surface of the motion transformer 120 (e.g., as disclosed in U.S. application Ser. No. 13/187,848, filed 21 Jul. 2011, incorporated herein in its entirety by this reference.

However, the motion transformer couple 130 can be configured in any suitable manner.

3.2 Stabilization Mechanism

The tire inflation system 10 includes a stabilization mechanism 550 that functions to compensate for forces applied by the primary pump 200 on the driving mechanism (e.g., a motion transformer 120 of the driving mechanism). The stabilization mechanism 550 can additionally or alternatively function to reduce and/or prevent eccentric mass spin (e.g., during a mass spin state). In the mass spin state, the eccentric mass preferably rotates (e.g., spins) with the rotating surface 20. Additionally or alternatively, in the mass spin state, the eccentric mass can be in any state hindering the generation of a pumping force from the relative motion between the eccentric mass and a rotating surface, but the mass spin state can be otherwise defined.

Figure 2A:
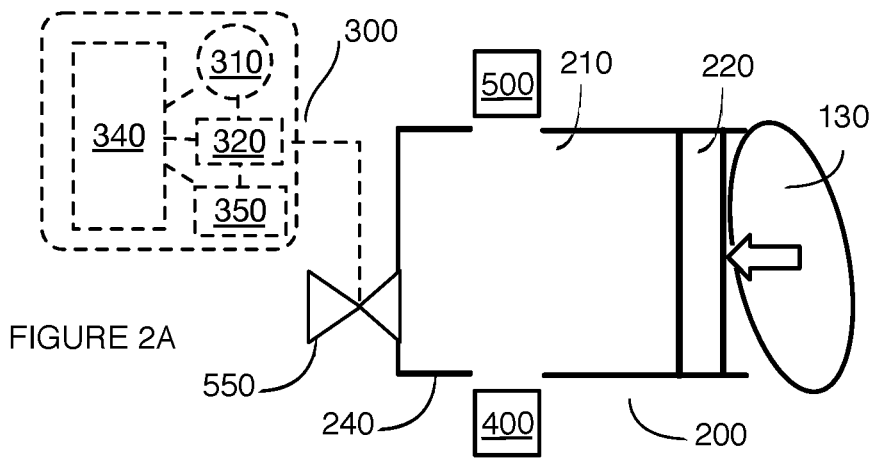
FIGS. 2A-2C are schematic representations of variations of the pump system and the stabilization mechanism.
Figure 2B:
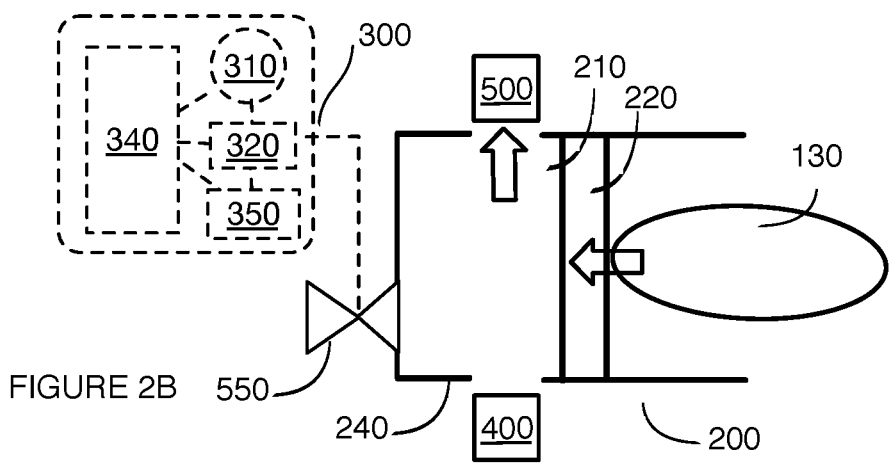
Figure 2C:
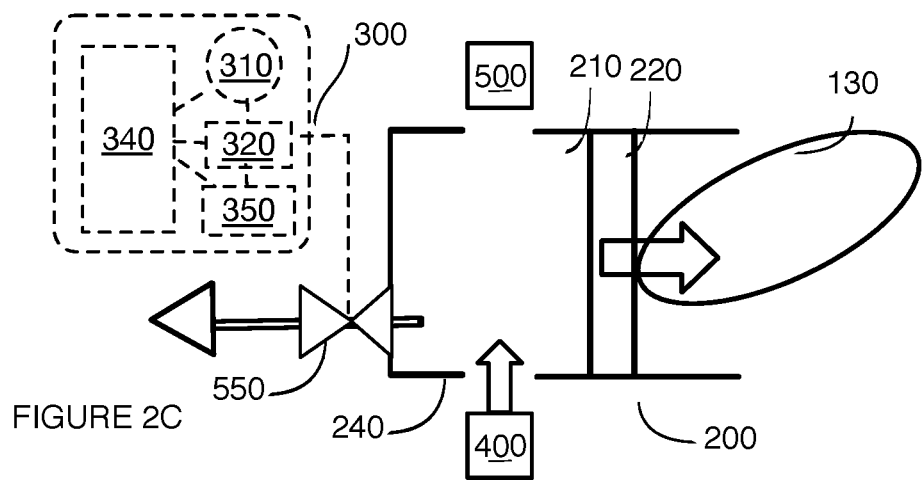

As shown in FIGS. 2A-2C, the stabilization mechanism 550 is preferably actively operable (e.g., controlled by a processing system 320) between an alleviation mode (e.g., where the stabilization mechanism 550 alleviates back force applied from the primary pump 200 on the driving mechanism) and a recovery mode (e.g., where the stabilization mechanism 550 enables the tire inflation system 10 to transition back into a non-mass spin state). The stabilization mechanism 550 is preferably configured to enter an alleviation mode (e.g., from a processing system 320 actively actuating the stabilization mechanism 550) in response to parameters (e.g., eccentric mass spin parameters measured by a sensor set 310) indicating a mass spin state. Additionally or alternatively, the stabilization mechanism 550 can be configured to enter the alleviation mode in response to an unstable state of the motion transformer, the motion transformer couple, the mass couple 142, and/or any other suitable component. However, the stabilization mechanism 550 can be configured to enter the alleviation mode in response to any suitable trigger event. Additionally or alternatively, the stabilization mechanism 550 can be passively operated and/or otherwise operated.

The stabilization mechanism 550 is preferably a fluid valve configured to selectively vent the pump cavity 210, but can additionally or alternatively include a clutch mechanism, the eccentric mass 140, the mass couple 142, the motion transformer 120, the motion transformer couple 130, and and/or other suitable components. The pump system 15 can include any combination of stabilization mechanisms 550. The pump system 15 can include a plurality of stabilization mechanisms 550 configured to operate in parallel, serial, and/or at any suitable time. For example, the pump system 15 can include a primary stabilization mechanism 550 (e.g., a fluid valve), and a secondary stabilization mechanism 550 (e.g., a clutch mechanism) configured to be actively actuated by the processing system 320 in response to failure of the primary stabilization mechanism 550 to sufficiently reduce eccentric mass spin.

However, the stabilization mechanism 550 can be configured in any suitable manner.

3.2.A Stabilization Mechanism—Fluid Valve

In an embodiment, the stabilization mechanism 550 can include one or more fluid valves (e.g., stabilization valves), which function to selectively vent (e.g., purge) the pump cavity 210 and/or other suitable components to reduce back pressure applied to the driving mechanism. For example, in some circumstances, the back force that can cause the eccentric mass 140 to enter a mass spin state can be reduced by release of pressure within the primary pump 200 (e.g., release of pressure within a pump cavity 210, within a pump lumen, etc.), which can in some variations be accomplished by opening a suitable fluid valve (or fluid valves).

Figure 6:
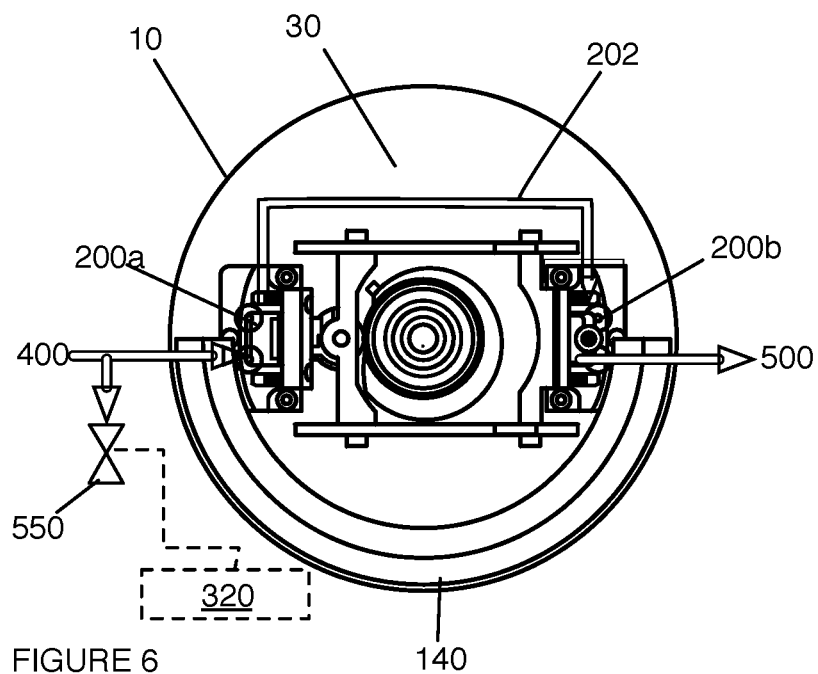
FIG. 6 is a schematic representation of the tire inflation system.

As shown in FIGS. 1 and 6, the fluid valve is preferably fluidly connected with the pump cavity 210 of the primary pump 200 (e.g., configured to release fluid from the pump cavity 210), but can additionally or alternatively be fluidly connected to any suitable component for alleviating unstable eccentric mass movement. Further, the fluid valve is preferably fluidly connected with one or more fluid reservoirs (e.g., configured to release fluid into the fluid reservoir). For example, the fluid valve can define a fluid path fluidly connecting the pump cavity 210 to the fluid reservoir (e.g., a fluid path beginning at the pump cavity 210 and ending at the fluid reservoir). The fluid reservoir can include: the ambient environment, the interior of the housing 30 (where the housing 30 functions as a pressurized first fluid reservoir 400 that can be recirculated back into the second reservoir 500), the tire interior, and/or any other suitable fluid reservoir.

The fluid valve is preferably operable between an open position and a closed position (e.g., any position between and including fully open and fully closed). The fluid valve preferably allows fluid to travel through the fluid valve in the open position, and preferably restricts fluid travel through the fluid valve in the closed position. In particular, the fluid valve preferably includes a valve actuator configured to transition the fluid valve between the open and closed positions. The fluid valve can be configured to enter the open position in response to detection of a mass spin state and/or imminent mass spin, and to enter the closed position in response to sufficient alleviation of the mass spin state (e.g., detection of a non-spin state or mass spin state exit) and/or the imminent mass spin. During the mass spin state and/or imminent mass spin, the fluid valve can be configured to operate in the open position during the entire period or a partial period of the mass spin state (e.g., while the measured parameters continue to indicate an eccentric mass spin state) and/or imminent mass spin. In a variation, the fluid valve can be configured to operate in the open position concurrently with the primary pump 200 operating in recovery mode (e.g., during a actuating element's recovery stroke, which can apply the back force on the drive mechanism 100), and to operate in the closed position concurrently with the primary pump 200 operating in compression mode. However, the fluid valve can operate in any suitable mode at any suitable time.

The fluid valve is preferably an active valve, but can alternatively be a passive valve (e.g., passively controlled). Examples of fluid valves that can be used include: electric control valves, centrifugal force valves, spring-based valves, pneumatic valves, hydraulic valves, and/or any other suitable type of valves.

When the fluid valve is an active valve, the fluid valve (e.g., a valve actuator of the fluid valve) is communicably coupled (e.g., through electrical wiring, through a wireless communications module 350 of the fluid valve, etc.) to the processing system 320 of the control system 300, which can be configured to actively actuate (e.g., turn, provide torque to, etc.) the fluid valve to transition the fluid valve between open and closed modes (e.g., alleviation and recovery modes). However, the fluid valve can be otherwise controlled.

In a variation, the fluid valve is an electric control valve. The electric control valve preferably includes an electric actuator electrically connected to the processing system 320 and configured to provide an actuation force to a valve actuator in operating between open and closed positions. The actuation force can be a rotational force, a linear force, or be any other suitable force. For example, the processing system 320 can be configured to apply an electric current to a solenoid of the electric control valve in response to detection of a mass spin state and/or imminent mass spin, where the electric control valve is configured to operate the electric motor to actuate the fluid valve (e.g., open the fluid valve to relieve pump cavity 210 fluid pressure) in response to the applied electric current. Examples of electronic control valves that can be used include: solenoid control valves, dual solenoid control valves, single point insertion flow metering valves, electric actuator valves, or any other suitable type of electronic control valve. The electronic control valves can be actuated magnetically (e.g., energizing a solenoid which induces a magnetic field within along the central axis of the solenoid), electronically (e.g., through a direct wire electronic connection), via wireless electromagnetic communication (e.g., through a radio transmission), or in any other suitable actuation-initiating manner.

In another variation, the fluid valve is a pneumatic valve configured to convert pneumatic energy into mechanical motion for operating the pneumatic valve. The pneumatic valve is preferably an actively operated pneumatic valve. For example, the pneumatic valve can include a valve fluid reservoir, a valve actuator (e.g., piston or diaphragm) fluidly connected to the valve fluid reservoir and configured to operate the valve in response to receiving fluid pressure from fluid in the valve fluid reservoir, where the processing system 320 is configured to control the valve fluid reservoir to release fluid for actuating the valve actuator. In another example, the pneumatic valve can be electrically connected to a pressure transmitter configured to monitor pressure in the pump cavity 210, and to transmit a fluid at a predetermined fluid pressure in response to the pressure transmitter measurements exceeding a pressure threshold (e.g., corresponding to eccentric mass spin). Alternatively, the pneumatic valve can be a passively operated pneumatic valve. For example, the pneumatic actuator can be a spring-opened pneumatic actuator configured to operate in an open mode in response to fluid pressure overcoming the spring pressure threshold (e.g., corresponding to eccentric mas spin) to actuate the pneumatic valve. However, the pneumatic valve can be otherwise configured.

In another variation, the fluid valve is a spring-based valve operable between open and closed positions based upon spring position (e.g., relaxed, compressed, stretched, etc.). The spring-based valve is preferably an actively operated spring-based valve. For example, the spring-based valve can include an electrically controlled spring operable between relaxed and stretched positions based on the magnitude of an excitation current (e.g., controlled by an electrically connected processing system 320) applied to the spring. In this example, the spring-based valve can be configured to release fluid from the fluid cavity at different rates based on spring position. In another example, the processing system 320 can be configured to control the spring-based valve to release the spring, thereby operating the valve, in response to power loss (e.g., which can be correlated with an unstable mass spin state effecting power provision by the power module). However, the spring-based valve can be passively controlled and/or otherwise operated.

In another variation, the fluid valve is a passive centrifugal force valve operable between open and closed positions based on the amount of applied centrifugal force. For example, the centrifugal force valve can be configured to open along an actuation axis in response to application of a centrifugal force exceeding a cracking force, the cracking force selected based on the centrifugal force generated by wheel rotation at or near a resonant frequency of the drive mechanism 100. The centrifugal force valve can include a valve mass element that acts as a valve actuator. The valve mass element can define an actuation axis aligned with a centrifugal force vector generated from wheel rotation speed near the drive mechanism 100 resonant frequency, where the valve mass element is configured to actuate along its actuation axis (e.g., as guided by a compliant element such as a spring physically connected to the valve mass element) in response to the centrifugal force vector exceeding a cracking force, thereby actuating the valve into an open position. Further, the valve mass element can be configured to return along its actuation axis to its original position, in response to the centrifugal force vector below the cracking position, thereby returning the valve into a closed position. In this variation, the centrifugal force valve can be mounted to the housing 30 and arranged with the actuation axis substantially radially aligned relative to the drive mechanism rotational axis. However, the passive centrifugal force valve can be configured in any manner.

Figure 5:
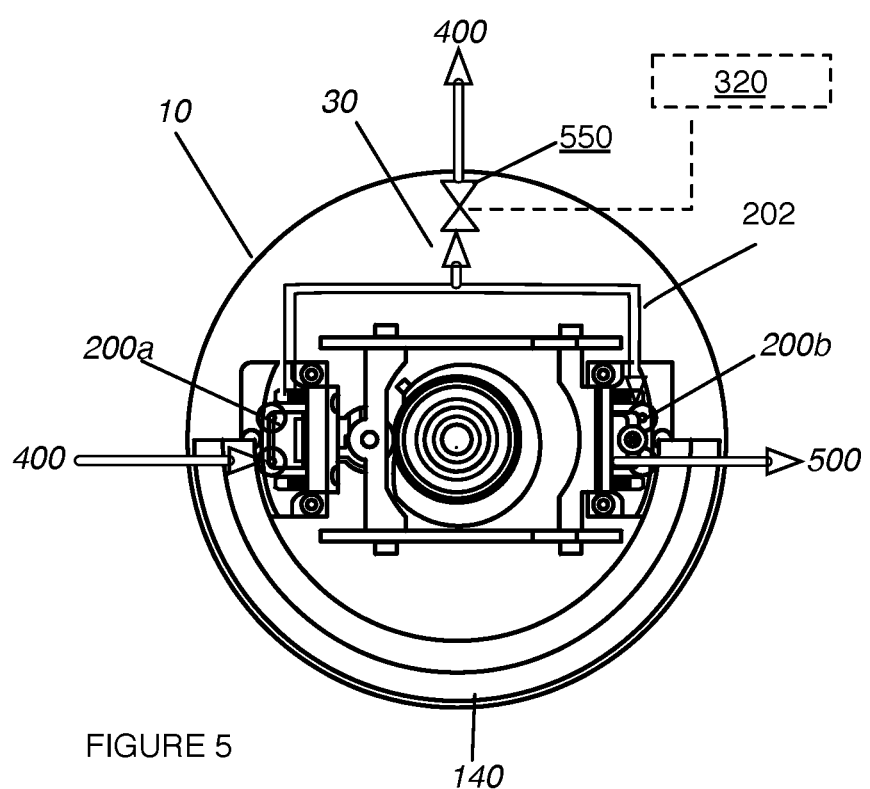
FIG. 5 is a schematic representation of the tire inflation system.
Figure 7:
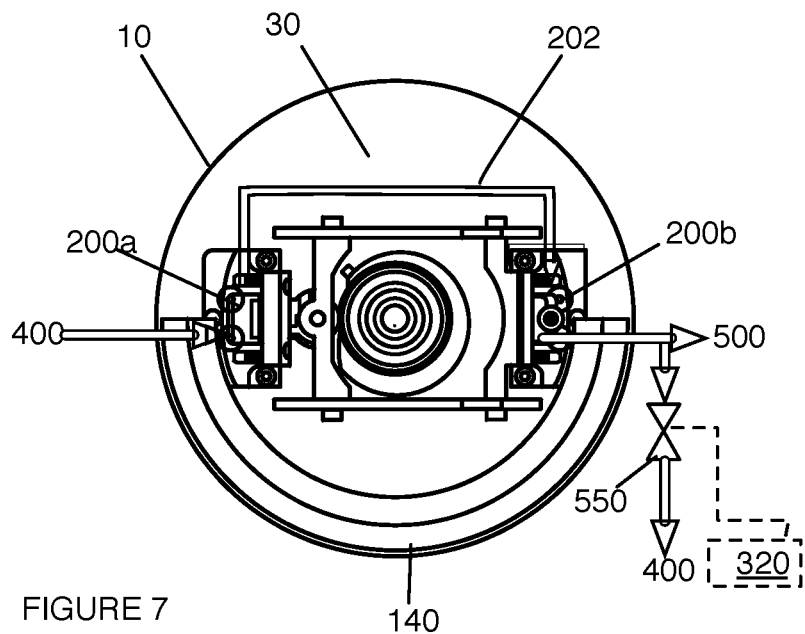
FIG. 7 is a schematic representation of the tire inflation system.

The fluid valve is preferably positioned proximal the pump cavity 210 and the fluid reservoir. In a variation, the fluid valve is positioned at or fluidly connected to the pump body 240 (e.g., mounted to the housing, embedded with the pump body 240). The fluid valve can include a first end defined by a wall or closed end of the pump body 240, a second end fluidly connected to the fluid reservoir, and a fluid valve actuator configured to open and/or close the fluid path connecting the first and second ends. In another variation, the fluid valve can be positioned proximal a lumen cooperatively defined by the pump cavity 210 and the actuating element 220 (e.g. where the actuating element 220 is configured to perform compression strokes and/or recovery strokes through the lumen). The fluid valve can include an end defined by a lumen wall (e.g., a portion of the lumen wall proximal the closed end of the pump body 240, a portion of the lumen wall proximal the motion transformer couple 130, etc.). In a variation where the pump is a reciprocating pump, the fluid valve can be positioned at or fluidly connected to the pump chamber of the reciprocating pump (e.g., a closed end of the pump chamber). In a variation where the pump is a peristaltic pump, the fluid valve can be positioned at or fluidly connected to the tube or diaphragm actuating element 220. For example, the fluid valve can include an end physically connected to a portion of the tube wall. In this variation, the fluid valve can additionally or alternatively be positioned at or fluidly connected to the groove (e.g., where the rotor is located) and proximal the rotor. However, the fluid valve and components of the fluid valve can be located at any suitable location relative the pump system 15. In a variation where the pump system 15 includes a plurality of pumps (e.g., a secondary pump, a tertiary pump, etc.), the fluid valve can be positioned at any suitable location relative the non-primary pumps (e.g., positioned at a pump cavity 210 of the secondary pump). In one embodiment, one fluid valve can be connected to one or more of the multiple pump cavities. In a second embodiment, each pump cavity can be connected to a different fluid valve. As shown in FIG. 5, in a variation where the pump system 15 includes a primary pump 200a, a secondary pump 200b, the fluid valve can be fluidly connected to a fluid manifold fluidly connecting the pump cavities of the respective pumps 200a, 200b. Alternatively, as shown in FIG. 7, the fluid valve can be fluidly connected with the pump cavity of the secondary pump 200b. However, the fluid valve can be otherwise positioned relative a secondary pump 200b and/or a fluid manifold 202.

The tire inflation system 10 preferably includes electrical wiring positioned between and electrically connecting the fluid valve and the processing system 320. In a variation, the electrical wiring can be substantially parallel the drive mechanism rotational axis (e.g., where the processing system 320 is aligned with the fluid valve along an alignment axis parallel the rotation axis and/or along an axis normal to a face of the housing interior. In another variation, the electrical wiring can be parallel a radial vector extending from the drive mechanism rotational axis. Additionally or alternatively, the electrical wiring can be angled in any suitable configuration relative components of the tire inflation system 10.

The fluid valve can define a fluid path substantially parallel a radial vector extending from the rotation axis of the driving mechanism (e.g., in a fluid valve positioned at a closed end of the pump body 240) and/or an actuation axis of the actuating element 220 (e.g., in a reciprocating pump). Alternatively, the fluid path can be substantially normal the radial vector (e.g., in a fluid valve positioned at a wall of the pump body 240), but can be at any suitable angle to any suitable axes and/or reference feature.

The fluid valves of the stabilization mechanism 550 can be functional directional control valves, The fluid valves are preferably one-way valves (e.g., configured to release fluid from the fluid cavity into a reservoir) but can alternatively be two-way valves, three-way valves, two-way/two-position ("2-2") valves, and/or possess any suitable directionality characteristic. The fluid valves can have two-ports (e.g., a check valve), three-ports (e.g., shuttle valves), or any suitable number of ports (e.g., a valve which compares pressures at some ports and permits or inhibits fluid flow based on a comparison of input pressures). The fluid valves can have a substantially circular cross section, a substantially square cross section, or any other suitable shape. The fluid valves can be made of brass alloys, stainless steel, carbon steel, nickel alloys, titanium alloys, copper alloys, corrosion-resistant materials, substantially fluid impermeable materials, cost-effective materials, or any other suitable type of material. However, the valves can have any suitable geometry and shape to facilitate pressure relief from the pump cavity 210.

Additionally or alternatively, the fluid valves can be configured in any suitable manner.

3.2.B Stabilization Mechanism—Clutch Mechanism

In another embodiment, the stabilization mechanism 550 can include one or more clutch mechanisms, which function to mechanically engage and/or disengage components of the pump system 15 to hinder the pump system's translation of rotational motion into linear motion, in order to alleviate forces applied by the primary pump 200 on the drive mechanism 100.

The clutch mechanism is preferably operable between an engaged mode and a disengaged mode. The clutch mechanism preferably includes a driving member mechanically coupled (e.g., transiently coupled) with a driven member in the engaged mode, and preferably includes a driving member mechanically decoupled (e.g., transiently decoupled) from the driven member in the disengaged mode. Further, the clutch mechanism is preferably configured to mechanically actuate the driving member and/or the driven member to mechanically engage (e.g., facilitate motion transfer) or disengage pump system components mechanically coupled to the clutch mechanism. Additionally or alternatively, the clutch mechanism can engage and/or disengage (e.g., mechanically, hydraulically, etc.) any suitable components.

In a first variation, the clutch mechanism is configured to mechanically engage and/or disengage components of the primary pump 200 from components of the drive mechanism 100. In an example, the inflation system can include a clutch mechanism positioned between and mechanically coupled to the motion transformer couple 130 and the motion transformer 120. In a specific example, the driving member is mechanically coupled to the motion transformer couple 130, and the driven member is mechanically coupled to the motion transformer 120. In another specific example, the clutch mechanism can include an actuating element 220 coupled normally to a face of the motion transformer 120 (e.g., cam module) and configured to actuate the motion transformer 120 out of alignment with the motion transformer couple 130, where in the clutch mechanism disengaged mode, the motion transformer 120 is misaligned from the motion transformer couple 130 along a radial vector extending from the rotation axis. In another example, the clutch mechanism can include an actuation element mechanically coupled to the mass transformer couple and/or the mass transformer, and configured to actuate the mass transformer couple and/or the mass transformer along the radial vector extending from the rotational axis of the drive mechanism, where in the disengaged mode, the mass transformer couple and mass transformer are mechanically decoupled and radially aligned along the radial vector. In another example, the clutch mechanism can be arranged between the drive mechanism (e.g., between the mass transformer and the system housing), wherein clutch engagement connects the drive mechanism rotation to one or more gears that control drive mechanism rotation. In a specific example, the clutch can be engaged when a mass spin state (e.g., current or imminent) is detected, wherein clutch engagement slows and/or controls mass transformer and eccentric mass rotation about the pump system. In other examples, the clutch mechanism is mechanically coupled to the primary pump 200 and configured to actuate the primary pump 200 relative the mass transformer.

In another variation, the clutch mechanism is configured to mechanically engage and/or disengage components of the pump system 15 from the rotating surface 20. For example, the clutch mechanism can be positioned between the rotating surface 20 and the primary pump 200, the clutch mechanism including a driving member statically coupled to the rotating surface 20, and a driven member mechanically coupled to the primary pump 200. In a specific example, the primary pump 200 can include a friction surface transiently coupled to the rotation surface, and a clutch mechanism mechanically coupled to the primary pump 200 and configured to actuate the primary pump 200 along an axis normal to a face of the friction surface, where in the clutch mechanism disengaged mode, the primary pump friction surface is mechanically decoupled from the rotating surface 20.

The clutch mechanism is preferably an actively controlled electromagnetic clutch mechanism. Additionally or alternatively, the clutch mechanism can be a passively controlled clutch (e.g., a centrifugal clutch mechanism), and/or other suitable clutch mechanism (e.g., hydraulic clutch, belt clutch, dog clutch, wrap-spring clutch etc.). The clutch mechanism is preferably electrically connected to the processing system 320, which can be configured to control operation of the clutch mechanism (e.g., transition the clutch mechanism between engaged and disengaged mode). In an example, the inflation system can include an electromagnetic clutch mechanism including a magnetizable rotor magnetically coupled to an armature, the armature mechanically coupled to a driven member (e.g., a mass transformer couple, a mass transformer, etc.), and a processing system 320 configured to apply a current to the electromagnetic clutch to generate a magnetic field (e.g., in response to a stabilization mechanism 550 alleviation mode triggering event), where the armature is frictionally coupled to the rotor in the engaged mode, and frictionally decoupled from the rotor the disengaged mode.

However, the clutch mechanism can be configured in any suitable manner.

3.2.C Stabilization Mechanism 550—Couple

In another embodiment, the stabilization mechanism 550 can be the mass couple 142, the motion transformer couple 130, and/or any other suitable couples between components of the pump system 15 and/or the rotating surface 20. In this embodiment, the stabilization mechanism 550 couple is preferably an electrically controlled actuatable coupling mechanism, which can be electrically connected to the processing system 320 (e.g., configured to actively control the coupled state and decoupled state between components), and configured to actuate one or more mounted components. In a variation, the electronically controlled actuatable coupling mechanism can be configured to couple and/or decouple the mounted components (e.g., decouple the motion transformer couple 130 from the motion transformer 120 to prevent back force applied by the motion transformer couple 130 to the motion transformer 120). In another variation, the electronically actuatable coupling mechanism can actuate the eccentric mass 140 and/or the motion transformer 120 along the, which can reduce static unbalance and prevent the eccentric mass 140 from reaching a mass spin state. For example, the eccentric mass 140 can be mechanically coupled to the motion transformer 120 through an electrically controlled adjustable rod configured to actuate the eccentric mass 140 closer to the motion transformer 120 (e.g., through a processing system 320 configured to control the adjustable rod in response to detecting a mass spin state and/or imminent mass spin).

However, any suitable couple can be otherwise configured as a stabilization mechanism 550.

3.2.D Stabilization Mechanism—Vehicle

In another embodiment, the stabilization mechanism 550 can include the vehicle to which the rotating surface 20 is attached. In this embodiment, the control system 300 is preferably communicably coupled to the vehicle (e.g., through an on-board diagnostics port, wirelessly with a vehicular communication system, etc.). In a variation, the vehicle is a master device, and the control system 300 is the slave device. In this variation, the vehicle can be configured to detect a mass spin state and/or imminent mass spin (e.g., based on vehicle sensors such as a vehicle camera oriented towards the eccentric mass 140, based on vehicular speed indicating a mass spin state and/or imminent mass spin, etc.). The vehicle can be configured to communicate with the control system 300 (e.g., controlling the control system 300 to actuate a fluid valve stabilization mechanism 550) in response to the vehicle detecting the mass spin state and/or imminent mass spin. Alternatively, the vehicle can control itself (e.g., decelerate), and/or perform any suitable action for alleviating a mass spin state and/or imminent mass spin. In another variation, the control system 300 is the master device, and the vehicle system is the slave device. In this variation, the control system 300 can include a processing system 320 configured to communicate with the vehicular control system 300 (e.g., notifying the driver at an interface of the vehicle to slow down, controlling the vehicle to decelerate) in response to a triggering event (e.g., detecting an eccentric mass 140 state based on collected sensor data). In another variation, the tire inflation system 10 can be communicably coupled (e.g., though a Bluetooth wireless connection) with a user device (e.g., a user smartphone), and configured to automatically prompt the user to perform an action (e.g., decelerate, pull over, etc.) to stabilize a mass spin state and/or imminent mass spin.

However, the vehicle can be otherwise configured as the stabilization mechanism 550.

3.3 Control System.

As shown in FIGS. 2A-2C, the tire inflation system 10 includes a control system 300, which can include a sensor set 310, a processing system 320, power module, and/or a communications module 350. The control system 300 functions to control operation of the stabilization mechanism 550 (e.g., in response to detecting a mass spin state and/or imminent mass spin). The control system 300 preferably actively controls operation of the stabilization mechanism 550 (e.g., controlling the stabilization mechanism with the processing system 320), but can additionally or alternatively passively control operation of the stabilization mechanism 550 (e.g., where the control system includes a passively-activated valve actuator, such as the inertia imparted on the disc of a valve, etc.). The control system 300 can additionally or alternatively function to collect sensor measurements, process sensor measurements, and/or determine a mass spin state and/or imminent mass spin. However, the control system 300 can be configured in any suitable manner.

3.3.A Control System—Sensor Set

As shown in FIGS. 1, 2A-2C, and 3A-3B, the control system 300 can include a sensor set 310 configured to measure an eccentric mass parameter. The sensor set 310 functions to monitor one or more parameters indicative of eccentric mass spin. The sensor set 310 can include any number of sensors.

The sensor set 310 preferably monitors one or more eccentric mass parameters indicative of a mass spin state and/or imminent mass spin. Eccentric mass parameters can include any one or more of: inflation system parameters (e.g., pump system parameters, drive mechanism parameters, etc.), rotational surface parameters (e.g., wheel parameters, hub parameters, etc.), vehicle parameters, ambient parameters, or any other suitable parameter. Examples of monitored parameters include: temperature, humidity, pressure, viscosity, velocity, angular movement (e.g., acceleration, velocity, displacement, etc.; of the eccentric mass 140, motion transformer 120, drive mechanism 100, housing 30, tire, etc.), radial movement (e.g., acceleration, velocity, displacement, etc.; of the eccentric mass 140, motion transformer 120, drive mechanism 100, housing 30, tire, etc.), force, centripetal force, centrifugal force, acceleration (e.g., lateral acceleration, relative to a gravity vector, etc.), torque, displacement, or any other suitable system parameter indicative of a mass spin state and/or imminent mass spin.

The sensor set 310 is preferably communicably connected (e.g., through electrical wiring, through a wireless communication module of the sensor set 310, etc.) to the processing system 320. The processing system 320 is preferably configured to control operation of the sensor set 310 (e.g., control the sensor set 310 to collect sensor data, control the sensor set 310 to re-position and/or re-orient itself, etc.). Further, the processing system 320 is preferably configured to receive sensor data collected at one or more sensors of the set. In a variation where the sensor set 310 includes a plurality of sensors, the processing system 320 can control the plurality of sensors individually (e.g., control an angular velocity sensor to monitor angular velocity of the eccentric mass 140 in response to vehicular speed above a threshold, and to control a pressure sensor to continuously monitor primary pump fluid pressure), in aggregate, and/or in any suitable manner. Additionally and/or alternatively, the pump system 15 can include one or more sensors communicatively coupled to the stabilization mechanism 550.

Figure 3A:
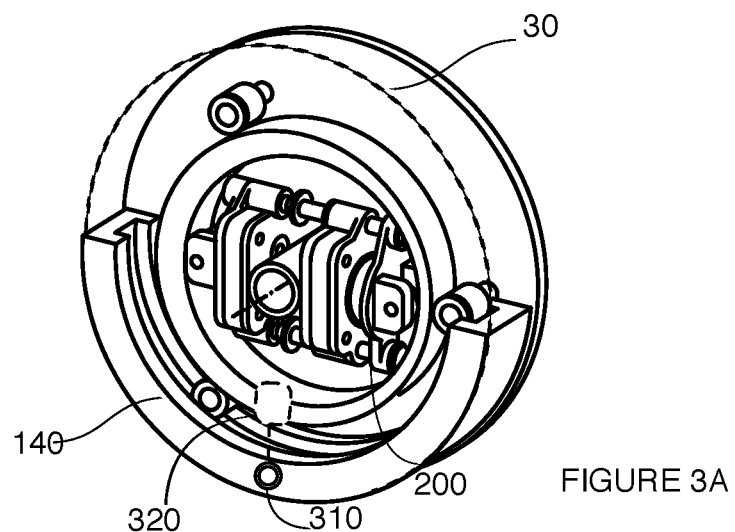
FIGS. 3A-3B are perspective views of variations of the processing system and sensor set of the tire inflation system.
Figure 3B:
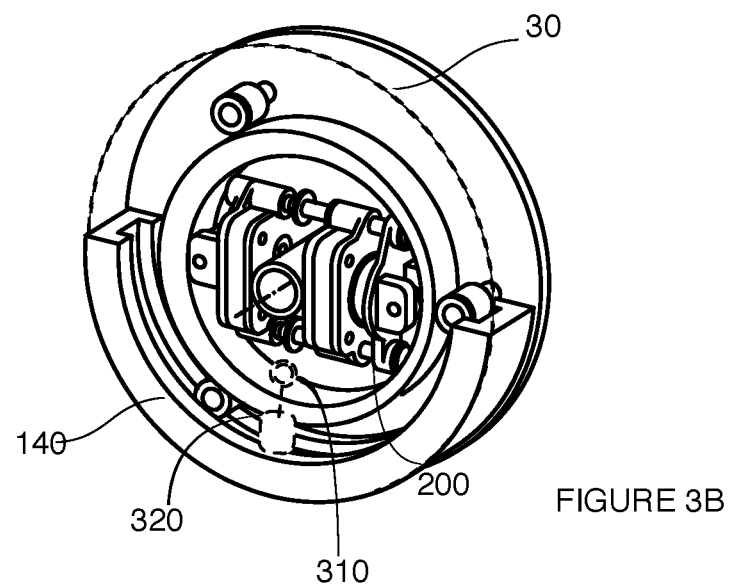

The sensor set 310 is preferably mounted to the monitored component (e.g., a pressure sensor mounted to the primary pump cavity 210 and configured to monitor the fluid pressure in the primary pump cavity 210), but can alternatively be mounted to an opposing surface or to any other suitable mounting point. For example, as shown in FIGS. 3A-3B, the sensors can be mounted to the housing 30 (e.g., interior or exterior), to the drive mechanism 100, to the eccentric mass 140, to the motion transformer 120, to the primary pump 200, or to any other suitable component of the pump system 15. When the sensor is mounted to a component that moves relative to the processing system, the sensor data connection can extend along the component, through the axis of rotation, and along the housing to the processing system. Alternatively, data can be transferred through a rotary union or any otherwise transferred.

In a first variation, the sensor set 310 can include a motion sensor (e.g., gyroscope, accelerometer, rotary sensor, optical sensors, orientation sensors, displacement sensors, magnetometers, etc.). The motion sensor is preferably mounted on the eccentric mass 140, but can additionally or alternatively be mounted on the mass couple 142, the motion transformer 120, and/or other suitable component. In a first example of the first variation, the motion sensor can be configured to measure the angular velocity of the eccentric mass 140 about a rotational axis of the drive mechanism Dm. In this example, the sensor set 310 can include a gyroscope mounted to the eccentric mass 140 and defining an axis (e.g., a z-axis) substantially parallel the rotational axis of the drive mechanism 100. In this example, the gyroscope can be mounted to a face of the eccentric mass 140 proximal a face of the housing interior, and electrically connected (e.g., through electrical wiring) to a processing system 320 mounted to the face of the housing interior.

In another example of the first variation, the sensor set can include an optical rotary encoder. In this example, the tire inflation system 10 can include a processing system 320 configured to translate a light pattern into an angular parameter (e.g., angular position, angular velocity, etc.) of the eccentric mass 140, and a sensor set 310 including an optical rotary encoder including a optical sensor (e.g., photodetector, camera, etc.) configured to receive the light pattern, and/or a light source (e.g., an LED light source). In a first specific example, the tire inflation system 10 can include a optical sensor positioned on the eccentric mass 140, a light source positioned on the housing 30 (e.g., interior face of the housing 30), and a processing system 320 configured to determine an angular parameter (e.g., angular velocity) based on the rate at which light (emitted by the light source) is detected at the optical sensor. In a second specific example, the optical sensor can be positioned on the housing 30, and the light source can be positioned on the eccentric mass 140. In a third specific example, the optical sensor and the light source can be positioned on the housing 30, where the light source can be oriented to emit light towards a drive mechanism 100 (e.g., towards the eccentric mass), wherein the drive mechanism 100 includes a visually distinguishable element (e.g., a reflective region producing a light pattern), and wherein the processing system 320 is configured to determine an angular parameter (e.g., angular velocity) based on data collected by the optical sensor (e.g., data analyzed to determine the periodicity of light reflectance, the periodicity of light dimming, etc.). In a fourth specific example, the optical sensor and the light source can be positioned on the eccentric mass 140, where the light source can be oriented to emit light towards the housing 30 (e.g., an interior face of the housing), wherein the housing includes a visually distinguishable element. Alternatively, the rotating encoder element can be the eccentric mass 140 (e.g., where the light source is positioned between the motion transformer 120 and a face of the eccentric mass 140, and the photo detector is positioned between the opposing face of the eccentric mass 140 and a face of the housing interior. However, the optical rotary encoder can be otherwise configured.

In another example of the first variation, the tire inflation system 10 can include an optical sensor (e.g., camera module) mounted to the housing 30. For example, the optical sensor can be mounted to an interior of the housing 30 and oriented with a field of view directed towards the eccentric mass 140, where the processing system 320 is configured to process images captured by the optical sensor to determine a relative motion parameter describing relative motion between the eccentric mass 140 and the housing 30, and to determine a mass spin state and/or imminent mass spin based on the relative motion parameter. Alternatively the optical sensor can be mounted to the eccentric mass 140. For example, the optical sensor can be mounted to a face of the eccentric mass 140 proximal the interior housing, the optical sensor oriented with field of view directed towards the interior housing.

In another example of the first variation, the sensor set 310 can include a speedometer. The speedometer can be configured to measure the translational velocity of the housing 30, which can be indicative of the vehicle speed. The speedometer can be mounted to the housing 30, mounted to the rotating surface 20, mounted to the vehicle (e.g., where the speedometer can be the vehicle speedometer, where the processing system 320 connects to the vehicle speedometer through an in-hub or in-axle connection), or be otherwise arranged. In this variation, the translational velocity of the housing 1710 can be used to infer the angular velocity of the eccentric mass 140 (e.g., the angular velocity of the eccentric mass 140 can have a characteristic dependence on the translational velocity of the housing 1710 that can permit inferring the former from the latter). In this example, the tire inflation system 10 can include a processing system 320 configured to determine that the eccentric mass 140 is in and/or approaching the mass spin state in response to the translational velocity of the housing 30 falling within a mass spin velocity range, wherein the mass spin velocity range is defined by a lower velocity threshold and an upper velocity threshold encompassing a characteristic velocity characterizing a resonant frequency of the drive mechanism. In a specific example, the processing system 320 can be configured to determine imminent mass spin in response to the translational velocity falling within a first mass spin velocity range, and/or to determine a mass spin state in response to the translational velocity falling within a second mass spin velocity range. The second mass spin velocity range preferably include an upper threshold greater than the upper threshold of the first mass spin velocity range, but can alternatively be smaller. The first and second mass spin velocity ranges can be overlapping, non-overlapping, and/or otherwise defined. However, the motion sensor can be configured in any suitable manner.

In a second variation, the sensor set 310 can include a pressure sensor configured to measure a fluid pressure indicative of current and/or imminent mass spin. The pressures sensor is preferably mounted to a primary pump component (e.g., pump cavity 210, pump lumen, etc.), that the pressures sensor is configured to monitor, but can additionally or alternatively be mounted to a fluid reservoir, and/or any suitable component. The pressure sensor measurement can be used to determine (e.g., infer) current and/or imminent mass spin. For example, current and/or imminent mass spin can be determined in response to the pressure sensor measurement value exceeding a threshold pressure value. The threshold pressure value can be: pre-set (e.g., by a manufacturer), user-determined, automatically learned, or otherwise determined. A first threshold pressure value corresponding to imminent mass spin is preferably smaller than a second threshold value corresponding to a mass spin state, but can be otherwise defined. The threshold pressure is preferably higher than the desired tire pressure, but can alternatively be any other suitable pressure. In another example, the pressure sensor can be configured to measure the pumping rate of a pump (e.g., primary pump 200, secondary pump 200b, etc.), which can be indicative of an eccentric mass parameter (e.g., eccentric mass spin rate, etc.) indicating a mass spin state. Additionally and/or alternatively, the fluid pressure measurement can be used to analyze fluid purity (e.g., blockages due to fluid particulates or contaminants could manifest as an increased fluid pressure), or for any other suitable purpose. In a specific example, the processing system 320 can detect an elevated fluid pressure based on a pressure measurement from the pressure sensor, and automatically initiate a purge cycle and/or a regeneration cycle, where contaminated fluid can be purged, and purified pressurized fluid can be reintroduced into the pump system 15. However, the pressure sensor can be configured in any suitable manner.

In a third variation, the sensor set 310 can include a vehicle sensor configured to collect vehicular sensor data (e.g., motion sensor data, camera data, proximity sensor data, on-board diagnostic system data, light sensor data, etc.) indicative of current and/or imminent eccentric mass spin. In an example, the processing system 320 can be configured to translate vehicle movement (e.g., speed, acceleration, etc.) data to an indicator of imminent mass spin, and/or to an indicator of a mass spin state. However, one or more vehicle sensors can be configured in any suitable manner.

In a fourth variation, the sensor set 310 can include a vibration sensor mounted to the monitored component (e.g., housing 30 of the pump system 15, eccentric mass 140, motion transformer 120, etc.) and configured to measure vibration of the monitored component. In an example, the processing system 320 can be configured to determine that the eccentric mass 140 is in and/or approaching the mass spin state in response to determining that the housing vibration measurements substantially match a predetermined vibration pattern associated with the mass spin state and/or imminent mass spin. However, the vibration sensor can be otherwise configured.

Sensors of the sensor set 310 can additionally or alternatively include any one or more of: motion sensors, acoustic sensors, thermal sensors, electrical sensors, magnetic sensors, fluid sensors, navigation sensors, optical sensors, orientation sensors, inertial sensors (e.g., accelerometers, gyroscopes, magnetometers, etc.), pressure sensors, proximity sensors, or any other suitable type of sensor. The sensors can optionally be paired with a signal emitter (e.g., acoustic emitter, optical emitter, etc.) that emits a signal sensed by the respective sensor.

However, the sensor set 310 can be configured in any suitable manner.

3.3.B Control System—Processing System

The control system 300 can include a processing system 320 that functions to receive measurements of the eccentric mass parameter from the sensor set 310, determine that the eccentric mass 140 is in a mass spin state and/or approaching a mass spin state based on the measurements of the eccentric mass parameter, and/or operate a stabilization mechanism 550 (e.g., fluid valve) in response to determination that the eccentric mass 140 is in and/or approaching the mass spin state.

The processing system 320 is preferably mounted to the housing 30 of the pump system 15 (e.g., to the housing interior, to the housing exterior), but can additionally or alternatively be mounted to the drive mechanism 100, be external the tire inflation system 10, or be positioned at any other suitable location.

The processing system 320 is preferably connected to and/or communicably coupled (e.g., through a wired electrical connection, a wireless communication link, etc.) to the stabilization mechanism 550 (e.g., to actuate the stabilization mechanism 550), the sensor set 310 (e.g., to control the sensor set 310 to collect sensor data), the power module, and/or the communications module 350, but can be communicably coupled with any suitable component.

The processing system 320 is preferably configured to receive and process one or more sensor set measurements for detecting mass spin (e.g., imminent mass spin, a mass spin state, etc.) and/or a non-spin state. In a variation, the processing system 320 is configured to derive an eccentric mass 140 angular velocity from the sensor measurements, to detect imminent mass spin in response to determining an eccentric mass 140 angular velocity in a first mass spin frequency range, to detect a mass spin state in response to determining an eccentric mass 140 angular velocity value in a second mass spin frequency range, and/or to detect a non-spin state in response to the angular velocity value outside of and/or exiting a mass spin frequency range (e.g., the second mass spin frequency range). In another variation, the processing system 320 can be configured to execute a predictive model with sensor set 310 measurements and/or other features (e.g., environmental data, location, etc.) for determining a mass spin state and/or non-spin state.

The mass spin frequency range corresponding to a mass spin state preferably includes the resonant frequency of the drive mechanism 100, but can be otherwise defined. Additionally or alternatively, the mass spin frequency range corresponding to imminent mass spin can include the resonant frequency of the drive mechanism 100. A mass spin frequency range can include a lower frequency threshold (lower than the resonant frequency of the drive mechanism 100 and a higher frequency threshold (greater than the resonant frequency of the drive mechanism 100. The lower and higher frequency thresholds can be pre-determined (e.g., pre-determined by the manufacturer), manually determined (e.g., by a user of the pump system 15), dynamically determined (e.g., determined by a machine learning module, based on observed behavior), or determined in any other suitable manner. The resonant frequency of the drive mechanism 100 can be determined from the drive mechanism mass and the drive mechanism mechanical coupling (e.g., effective spring constant) to its external environment (e.g., the housing 30 of the pump system 15), the eccentric mass' 140 mass and the eccentric mass' 140 mechanical coupling to the motion transformer 120, or otherwise determined. The resonant frequency of the drive mechanism 100 can optionally be determined from the static unbalance (sometimes called force unbalance) of the drive mechanism 100 about the drive mechanism 100 center of mass and/or mechanical damping (e.g., viscosity) in the drive mechanism 100 coupling to the external environment.

The processing system 320 is preferably configured to selectively control one or more stabilization mechanisms

550 in response to detecting mass spin (e.g., detecting an imminent mass spin state and/or that the eccentric mass is in a mass spin state). In a variation, the processing system 320 can be configured to control a valve actuator of a fluid valve to transition the fluid valve into an open position (e.g., in response to detecting an eccentric mass 140 angular velocity entering a mass spin frequency range) and/or closed position (e.g., in response to detecting an eccentric mass 140 angular velocity exiting a mass spin frequency range). In other variations, the processing system 320 can be configured to electrically control engagement and/or disengagement of driving and driven members of a clutch mechanism, to actively control a transient coupling mechanism to separate and/or combine sections of a collectively formed eccentric mass 140, to actively control a mass couple 142 and/or mass transformer couple (e.g., to couple and/or decouple mounted components), and/or to otherwise control one or more stabilization mechanisms 550.

The processing system 320 can be a central processing unit (CPU), microprocessor, GPU, organic processor, microchip, a remote server, or be any other suitable processing system 320 configured to receive sensor measurements, to perform a computation based in part on those measurements, and/or to issue an executable operation based in part on the output of the computation. While some variants of the processing system 320 include only a single processor, alternative variants can include two or more processors. In variants including multiple processors, the processors can be mounted in approximately the same location on the same component (e.g., two processors both mounted on the housing 30, with one processor functioning as a primary processor and a second processor functioning as a backup option in case of primary processor malfunction) or in disparate locations (e.g., mounted to different components of the pump system 15). In variants including multiple processors, the multiple processors can work in combination (e.g., performing computations in parallel and then subsequently synthesizing outputs, performing computations in series with a troubleshoot check after each step, etc.), can work independently (e.g., different processors separately perform computations and their outputs are compared in order to detect malfunction), or in any other suitable manner. In one example, the processing system 320 is mounted to the housing 30 and configured to receive measurements from one or more sensors. In this example, the processing system 320 can use those measurements to monitor system performance (e.g., recording system parameters for troubleshooting purposes, detecting a fluid blockage in a component of the pump system 15, determining that the eccentric mass 140 is in a mass spin state, etc.) and can undertake an action.

However, the processing system 320 can be configured in any suitable manner.

3.3.C Control System—Power Module

The control system 300 can include a power module, which functions to provide power to power-consuming components (e.g., sensor set 310, processing module, communications module 350, etc.) of the tire inflation system 10.

The power module is preferably electrically connected to the power-consuming components of the tire inflation system 10. The power module is preferably positioned proximal the processing system 320 (e.g., mounted to the interior housing), but can be otherwise located.

The power module preferably includes a battery (e.g., a rechargeable battery such as a lithium chemistry battery, non-rechargeable battery, etc.) but can additionally or alternatively include any combination of suitable energy storage, generation, and/or conversion modules. In an example, the power module includes a rechargeable battery configured to harvest a portion of the rotational motion of the rotating surface 20, the primary pump 200, and/or other suitable component in order to recharge the battery. The rechargeable battery can be mounted to the housing 30 and electrically connected to the processing system 320. In this example, the power module can include an electric generator electrically connected to the rechargeable battery. The electric generator can include a stator and a rotor, where the rotor can includes a portion of the motion transformer 120, the electric generator configured to convert a portion of rotational energy (e.g., facilitated by the motion transformer 120) into electrical potential energy. Additionally or alternatively, the electric generator can include an armature rotationally coupled to the rotating surface 20 and/or the primary pump 200, and configured to convert a portion of rotational energy into electric potential energy). However, the power module and components of the power module can be otherwise configured.

3.3.D Control System—Communications Module

The control system 300 can include a communications module 350, which functions to enable communication between the tire inflation system 10 and a user. Additionally or alternatively, the communications module 350 can function to enable communication between the processing system 320 and the sensor set 310, the processing system 320 and one or more stabilization mechanism 550, and/or communications with a remote server.

The communications module 350 can be within or mounted to the housing 30 of the primary pump 200 (e.g., interior housing), other components of the primary pump 200, the drive mechanism 100, and/or any other suitable component.

The communications module 350 can include one or more: antennas, wired communication modules (e.g., communication pins, Ethernet components, powerline components, etc.), wireless communication modules (e.g., Bluetooth components such as Bluetooth Low Energy components, WiFi chips, Zigbee, Z-wave, radios, radiofrequency, infrared, magnetic induction, etc.) and/or any other suitable components.

In a variation, the communications module 350 can be wirelessly coupled (e.g., via Bluetooth) to a user device. For example, the communications module 350 can be configured to communicatively connect the processing system 320 to a native application running on an external user device. In this variation, the communications module 350 can be configured to transmit mass spin state-related notifications (e.g., mass spin state status), driving prompts (e.g., prompting the user to decelerate), and/or other suitable communications to the user. Further, the communications module 350 can be configured to receive user instructions and/or to transmit the user instructions to the processing module (e.g., to actuate a stabilization mechanism 550, to initiate sensor data collection, etc.).

In another variation, the communications module 350 can be electrically connected to the processing module and wirelessly coupled to the stabilization mechanism 550. In this variation, the communications module 350 can be configured to transmit instructions generated by the processing module to the stabilization mechanism 550 (e.g., for actuating the stabilization mechanism 550 into an alleviation mode and/or recovery mode.), which can include a stabilization mechanism 550 communications module 350. In another variation, the communication module can be wirelessly coupled to one or more sensors of the sensor set 310, and configured to wirelessly receive sensor measurements and to transmit the sensor measurements to the processing module (e.g., through a wired electrical connection). In this variation, sensors of the sensor set 310 can include a sensor communication module (e.g., antenna for transceiving data).

However, the communications module 350 can be configured in any suitable manner

3.4 Pump System—Housing

The pump system 15 can additionally or alternatively include a housing 30 that functions to couple the pump system components to the rotating surface 20. The housing 30 is preferably configured to removably statically couple to the rotating surface 20, but can otherwise couple to the rotating surface 20. For example, the housing 30 can be configured to mount to a surface of a wheel. More preferably, the housing 30 is configured to mount (e.g., via a set of bolts, screws, etc.) to the hub of a tire, but can alternatively mount to the rim, axle, or any other suitable component of a tire.

The housing 30 is preferably rotatably coupled to the drive mechanism 100 and is preferably statically coupled to the pump body 240 of the primary pump 200, such that the primary pump 200 rotates with the housing 30. However, the housing 30 can be otherwise coupled to the pumping system components. The housing 30 can additionally function to mechanically protect the pump system components, where the housing 30 preferably substantially encloses the pump system components. The housing 30 is preferably substantially rigid, but can alternatively be substantially flexible. The housing 30 is preferably substantially fluid impermeable, but can alternatively be permeable to fluid. In one variation of the pump system 15, the housing 30 functions as the first reservoir 400, where the primary pump 200 inlet is fluidly connected to and draws fluid from the housing interior. In this variation, the housing 30 can include an inlet manifold fluidly connecting the housing interior with the ambient environment. The inlet manifold preferably includes a water-selective membrane that preferentially permits gas flow therethrough (e.g., the gas flow rate through the water-selective membrane is higher than the water flow rate through the water-selective membrane). The inlet manifold can alternatively include an inlet valve that controls fluid flow into the housing interior, but can alternatively not include any valves. The inlet valve is preferably a passive one-way valve operable between an open mode in response to the housing interior pressure falling below or being equal to the ambient pressure and a closed mode in response to the housing interior pressure exceeding the ambient pressure. However, the inlet valve can be an active valve, a two-way valve, or any other suitable valve.

Additionally or alternatively, the housing 30 can be configured in any suitable manner.

3.5 Relief Valve

Figure 4:
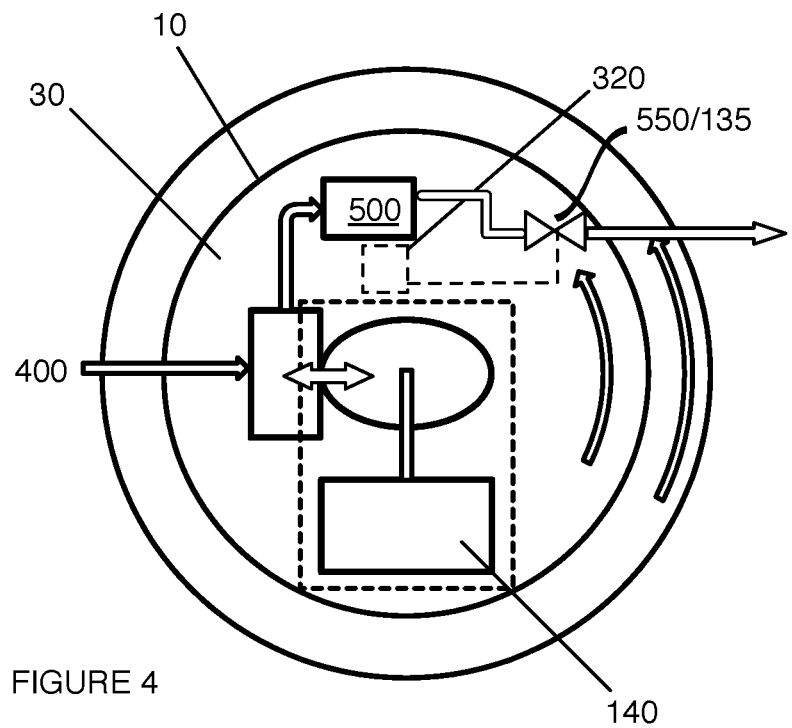
FIG. 4 is a schematic representation of the tire inflation system.

As shown in FIG. 4, the pump system 15 can optionally include a relief valve 135 which functions to leak air from the interior of the second reservoir 500 (e.g. tire interior) of the into the pump system 15, more preferably into the housing 30 of the pump system 15 (e.g. the first reservoir 400), but can alternatively leak air from the second reservoir 500 to the ambient environment.

The relief valve 135 preferably connects to the second reservoir interior through the Schrader valve of the second reservoir 500, but can otherwise fluidly connect to the second reservoir 500. The relief valve 135 preferably operates between an open mode where air flow through the relief valve 135 is permitted, and a closed mode where air flow through the relief valve 135 is prevented. The relief valve 135 preferably includes an open threshold pressure, and is preferably a fail closed relief valve 135. Alternatively, the relief valve can be a fail open valve 135, or fail in any other suitable configuration. The shutoff threshold is preferably set to leak second reservoir pressure at a rate substantially close to the flow rate of the pump (e.g. 10 cubic inches/minute), but can alternatively leak at a rate substantially close to the normal second reservoir leakage rate (e.g., 1-3 psi per month), but can alternatively leak second reservoir pressure at a higher or lower rate. The relief valve 135 can be actively operated (e.g., by a processing system configured to control the relief valve 135 between open and closed modes), passively operated, and/or otherwise controlled.

Additionally or alternatively, the relief valve 135 can be configured in any manner analogous to embodiments, variations, and examples described in U.S. application Ser. No. 14/839,009 filed 28 Aug. 2015, which is herein incorporated in its entirety by this reference. However, the relief valve 135 can be otherwise configured.

4. Method

Figure 9:
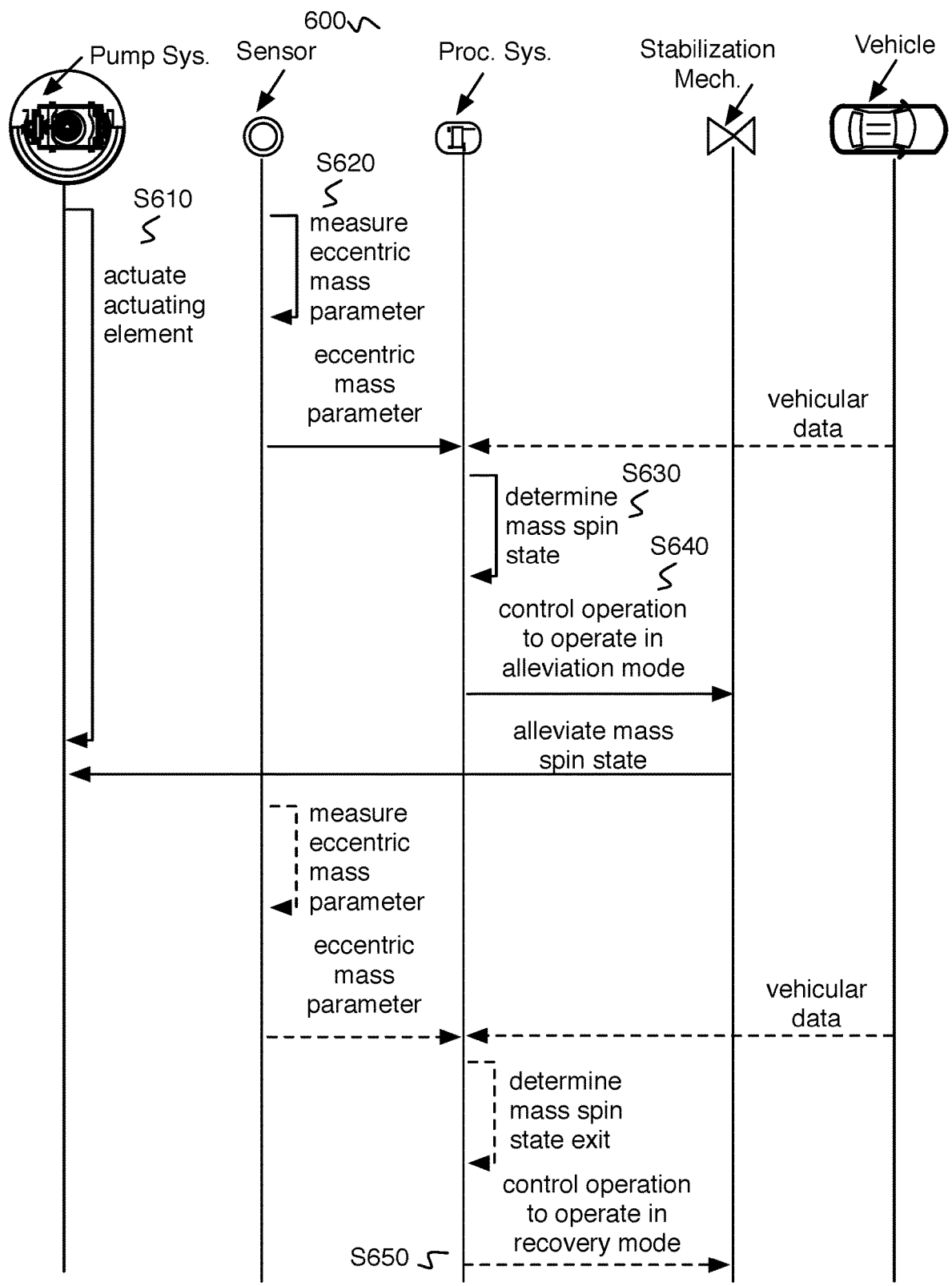
FIG. 9 is a flow chart representation of a method for inflating a tire supported by a wheel.

As shown in FIG. 9, a method 600 for stabilizing a tire inflation system for a tire supported by a wheel includes: actuating an actuating element relative a pump cavity using relative motion between a housing and an eccentric mass rotatably coupled to the housing at a rotation axis S610, measuring an eccentric mass parameter indicative of mass spin (e.g., imminent mass spin, a mass spin state, etc.) with a sensor set S620, determining a mass spin state S630, and selectively controlling operation of one or more stabilization mechanisms 550 S640. The method 600 can additionally or alternatively include controlling the stabilization mechanism to operate in a recovery mode S650. The method 600 functions to detect and/or mitigate eccentric mass spin resulting from conversion of rotary motion (e.g., of a tire) into a pumping force that facilitates eccentric mass angular rotation at a resonant frequency.

4.1 Actuating an Actuating Element.

Block S610 recites: actuating an actuating element relative a pump cavity using relative motion between a housing (e.g., statically mounted to the wheel) and an eccentric mass (e.g., having a center of mass offset from the rotation axis) rotatably coupled to the housing at a rotation axis. Block S610 functions to convert rotary motion (e.g., of a tire) into a pumping force. The actuating element is preferably automatically actuated concurrently with rotation of the rotating surface (e.g., while a user drives the vehicle), but can be actuated when the rotating surface is stationary (e.g., in a variation where the primary pump can rotate independently from the rotating surface such as by way of a roller bearing mass couple), and/or at any suitable time.

However, actuating an actuating element can be performed in any suitable manner.

4.2 Measuring an Eccentric Mass Parameter.

Block S620 recites: measuring an eccentric mass parameter indicative of mass spin with a sensor set, which functions to collect an eccentric mass parameter for determining a mass spin state in Block S630.

Measuring an eccentric mass parameter can be performed substantially continuously, at predetermined time intervals (e.g., every second, every 10 seconds, every minute, every half hour, etc.), in response to satisfaction of a condition (e.g., detecting rotating surface motion, starting the vehicle engine, manual request from a user at a user device communicably coupled to the communications module, etc.), and/or at any suitable frequency. Measuring an eccentric mass parameter is preferably performed prior to detecting a mass spin state, but can additionally or alternatively be performed concurrently, in response to, and/or after detecting a mass spin state, and/or at any suitable time. In variations where the sensor set includes a plurality of sensors, eccentric mass parameters can be measured at different sensors according to different frequencies and/or at different times.

However, measuring an eccentric mass parameter can be performed in any suitable manner.

4.3 Determining a Mass Spin State.

Block S630 recites: determining a mass spin state. Block S630 functions to identify when the eccentric mass is approaching a mass spin state (e.g., is in an imminent mass spin state) or is in a mass spin state. Determining a mass spin state and/or imminent mass spin is preferably based on one or more eccentric mass parameters (e.g., measured in Block S620), but can additionally or alternatively be based on environmental conditions (e.g., weather conditions, road conditions, etc.), user behavior (e.g., driver behavior, passenger behavior), vehicle conditions (e.g., tire conditions, engine conditions, etc.), and/or any other suitable information indicative of a mass spin state. Block S630 preferably includes actively determining a mass spin state and/or imminent mass spin (e.g., using a processing system and sensor set), but can additionally or alternatively include passively determining the mass spin state and/or imminent mass spin (e.g., mechanically, with a passive detection system, etc.), and/or through any suitable mechanism actively (e.g., using a processing system and sensor set), or in any other suitable manner.

In a first variation, the method boo can include measuring the angular velocity of the a drive mechanism component (e.g., an eccentric mass) about a rotational axis, and determining that the eccentric mass is in and/or approaching the mass spin state based on determining that the angular velocity of the eccentric mass falls within a mass spin angular frequency range defined by a lower angular frequency threshold and an upper angular frequency threshold encompassing a resonant frequency of the drive mechanism. For example, determining that the eccentric mass is approaching a mass spin state (e.g., determining that the eccentric mass is in an imminent mass spin state) include determining that an angular velocity of the eccentric mass falls within a first mass spin angular frequency range, and determining that the eccentric mass is in a mass spin state can be based on determining that the angular velocity falls within a second mass spin angular frequency range. The upper angular frequency threshold of the second mass spin angular frequency range is preferably greater than the upper angular frequency threshold of the first mass spin angular frequency range. The first and second mass spin angular frequency ranges are preferably non-overlapping, but can be overlapping (e.g., where the frequency ranges both encompass the resonant frequency of the drive mechanism), or otherwise defined. Alternatively, the eccentric mass can be determined to be approaching the mass spin state (e.g., determined as being in the imminent mass spin state) in response to the angular velocity falling within a predetermined range (e.g., of the angular frequency threshold), increasing beyond a threshold rate, or otherwise determined.

In a second variation, the method 600 can include measuring a displacement amplitude of the eccentric mass 140 in a plane normal to the rotational axis of the drive mechanism 100. For example, the method 600 can include measuring the displacement amplitude with a displacement sensor (e.g., an accelerometer, gyroscope, IMU, etc.) mounted to the monitored component (e.g., mounted to the housing for monitoring the displacement amplitude of the housing), or alternatively mounted to a surface opposing the monitored component, or to any suitable element. As the drive mechanism 100 approaches a resonance condition, the system can begin oscillating vertically relative to a gravity vector (e.g., "bouncing" or "shaking"). As such, Block S630 can include determining that a time series of the measured displacement amplitude substantially matches a predetermined pattern associated with a mass spin state (e.g., through machine learning approaches), a predetermined pattern associated with imminent mass spin, and/or a predetermined pattern associated with a non-spin state.

In a third variation, the method 600 can include measuring the time dependence of the eccentric mass oscillation amplitude. In a third variation, the method 600 can include measuring, with a motion sensor (e.g., gyroscope mounted to the eccentric mass), oscillations of the drive mechanism (e.g., eccentric mass). Drive mechanism oscillations can indicate that the motion is underdamped (e.g., oscillatory with an amplitude that decays exponentially in time with a decay constant), critically damped (e.g., relaxes towards equilibrium exponentially without oscillating and with a decay constant equal to the resonant frequency of the drive mechanism), or overdamped (e.g., relaxes towards equilibrium exponentially without oscillating and with a decay constant that is shorter in inverse time than the resonant frequency of the drive mechanism). Block S630 can include generating a comparison between a drive mechanism oscillation pattern (e.g., derived from measured drive mechanism oscillations) and one or more predetermined oscillation patterns associated with an underdamped state, critically damped state, or overdamped state. Further, Block S630 can include determining a mass spin state and/or imminent mass spin in response to the comparison indicating an underdamped state (e.g., based on a high similarity score between the drive mechanism oscillation pattern and a predetermined pattern associated with an underdamped state, a mass spin state, and/or imminent mass spin).

In a fourth variation, the method boo can include monitoring the relative timing of the vertical oscillations of the eccentric mass to the vertical oscillations of the drive mechanism overall. As the drive mechanism approaches a resonance condition, the drive mechanism and the eccentric mass can both begin to oscillate in a plane normal to the rotational axis of the drive mechanism (e.g., vertically relative to a gravity vector) about their respective equilibrium positions. The resonance condition can be a phase relationship, where he stabilization mechanism can determine that the eccentric mass is in the mass spin state or determine that the eccentric mass is approaching the mass spin state (e.g., determine that the eccentric mass is in the imminent mass spin state) when the oscillations of the eccentric mass and the oscillations of the drive mechanism are out of phase (or are close to being out of phase) by a phase angle of approximately 90° (e.g., the drive mechanism is moving upwards about its vertical equilibrium position at the approximately same time that the eccentric mass 140 is at its maximal vertical displacement) (e.g., where the phase difference is between 80°-100°, etc.). However, any other suitable resonance condition can be additionally or alternatively used. Alternatively, the stabilization mechanism (or any other suitable component of the pump system) can determine that the eccentric mass can be in and/or approaching a mass spin state in any suitable manner.

Determining an eccentric mass state is preferably in real-time (e.g., as the processing system receives sensor set measurements indicating an eccentric mass spins state), but can additionally or alternatively be in non-real time (e.g., processing sensor set measurements at predetermined time intervals, in response to threshold conditions, etc.), and/or at any suitable time.

However, determining a mass spin state and/or imminent mass spin can be performed in any suitable manner.

4.4 Selectively Controlling Operation of a Stabilization Mechanism.

Block S640 recites: selectively controlling operation of one or more stabilization mechanisms (e.g., to operate in alleviation mode). Block S640 functions to compensate for forces applied by the primary pump on the driving mechanism (e.g., a motion transformer of the driving mechanism). For example, Block S640 can include selectively venting the pump cavity by controlling a stabilization mechanism fluid valve (e.g., by applying an electric current with a processing system to a valve actuator), fluidly connecting the pump cavity to a fluid reservoir, to operate in an open position.

Selectively controlling a stabilization mechanism is preferably in response to detecting the mass spin state, but can additionally or alternatively be in response to detecting an unstable state of the motor transformer, the motor transformer couple, the mass couple, and/or any other suitable component.

Blocks S640 and S630 are preferably performed by a processing system, but can additionally or alternatively be performed with any suitable component (e.g., user device, vehicle).

However, selecting controlling operation of a stabilization mechanism can be performed in any suitable manner.

4.5 Controlling the Stabilization Mechanism to Operate in a Recovery Mode.

The method 600 can optionally include Block S650, which recites: controlling the stabilization mechanism to operate in a recovery mode. Block S650 functions to return the pump system 15 to normal operation for converting rotary motion into a pumping force for inflating a tire. In one example, this can include shutting off the stabilization mechanism fluid valve. However, normal pumping system operation can be otherwise achieved.

Controlling the stabilization mechanism to operate in a recovery mode is preferably in response to determining that the eccentric mass has exited the mass spin state and/or the imminent mass spin state. Determining a mass spin state exit is preferably based on eccentric mass parameters measured by a sensor set after determining a mass spin state (e.g. in Block S640). For example, the method 600 can include measuring one or more post-spin state eccentric mass parameters after detecting a mass spin state, and detecting a mass spin state exit by processing the post-spin state eccentric mass parameters with the processing system. However, determining a mass spin state exit can be performed at any suitable time.

In a first variation, the method 600 can include measuring the angular velocity of the drive mechanism component about a rotational axis after detecting a mass spin state, and determining a mass spin state exit in response to determining that the angular velocity falls outside the mass spin angular frequency range. In a second variation, the method boo can include measuring eccentric mass displacement amplitude after detecting a mass spin state, and determining a mass spin state exit in response to a time series of the displacement amplitude matching a predetermined profile associated with a non-spin state. In an third variation, the method boo can include measuring the time dependence of the eccentric mass oscillation amplitude after detecting a mass spin state, and determining a mass spin state exit based on the drive mechanism oscillation pattern matching a predetermined pattern associated with a critically damped and/or overdamped state. In a fourth variation, the method 600 can include monitoring the relative timing of vertical oscillations of the eccentric mass and the drive mechanism overall, and determining a mass spin state exit based on the relative timing indicating a phase angle associated with a non-spin state.

However, controlling the stabilization mechanism to operate in a recovery mode can be performed in any suitable manner.

Although omitted for conciseness, the preferred embodiments include every combination and permutation of the various system components and the various method processes, where the method processes can be performed in any suitable order, sequentially or concurrently.

As a person skilled in the art will recognize from the previous detailed description and from the figures and claims, modifications and changes can be made to the embodiments of the invention without departing from the scope of this invention defined in the following claims.

We claim:

1. A tire pressure management system for a tire supported by a wheel, the system comprising:
    a pump comprising a pump chamber;
    a housing mounted to the pump, the housing configured to mount the pump to a hub of the wheel;
    a tire inflation manifold configured to fluidly connect the pump chamber to the tire;
    a valve, connected between the pump chamber and a fluid sink, wherein the valve is separate from the tire inflation manifold; and
    a control system configured to selectively actuate the valve based on a parameter of the pump.

2. The system of claim 1, further comprising a drive mechanism connected to the pump, the drive mechanism configured to drive actuation of the pump, wherein the parameter of the pump comprises a back force applied by the pump on the drive mechanism, wherein the control system is configured to selectively open the valve in response to the back force exceeding a threshold value.

3. The system of claim 1, further comprising an eccentric mass rotatably mounted to the housing and offset from a housing rotational axis, wherein the eccentric mass is configured to drive actuation of the pump, wherein the parameter of the pump comprises a parameter of the eccentric mass.

4. The system of claim 3, further comprising a sensor, mounted to the housing and configured to monitor the parameter of the hanging mass.

5. The system of claim 3, wherein the parameter of the eccentric mass comprises a rotational frequency of the eccentric mass, wherein the control system is configured to open the valve when the rotational frequency falls within a predetermined range associated with an eccentric mass spin state, wherein the predetermined range encompasses a resonant frequency of the eccentric mass.

6. The system of claim 1, further comprising:
    a battery mounted to the housing and electrically connected to the valve; and
    a generator mounted to the housing and electrically connected to the battery.

7. The system of claim 6, wherein the generator comprises a stator statically mounted to the housing, a rotor rotatably mounted to the housing, and a hanging mass statically mounted to the rotor, the hanging mass freely rotatable relative to the housing.

8. The system of claim 1, wherein the fluid sink comprises an ambient environment, wherein the valve selectively fluidly connects the pump chamber to the ambient environment.

9. The system of claim 1, wherein the tire inflation manifold comprises a second valve configured to selectively fluidly connect the pump chamber to the tire.

10. The system of claim 1, wherein the control system comprises a processor mounted to the housing and electrically connected to the valve.

11. A tire pressure management system for a tire supported by a wheel, the system comprising:
- a housing configured to mount to a surface of the wheel;
- a pump mounted to the housing, the pump comprising an actuation mechanism and a pump chamber;
- a drive mechanism actuatably connected to the actuation mechanism;
- a tire inflation manifold configured to fluidly connect the pump chamber to the tire; and
- a valve, separate from the tire inflation manifold, that selectively fluidly connects the pump chamber to an ambient environment, wherein the valve is configured to actuate between an open and closed position based on a parameter of the pump.

12. The system of claim 11, wherein the parameter of the pump comprises a back force applied by the pump on the drive mechanism, wherein the valve is configured to open when the back force exceeds a predetermined force threshold.

13. The system of claim 11, wherein the drive mechanism comprises an eccentric mass offset from a housing center of rotation, the eccentric mass freely rotatable relative to the housing.

14. The system of claim 13, further comprising a sensor set configured to monitor a rotational frequency of the eccentric mass, wherein the valve is configured to open when the rotational frequency falls within a predetermined frequency range, wherein the predetermined frequency range encompasses a resonant frequency of the eccentric mass.

15. The system of claim 11, wherein the drive mechanism comprises an eccentric mass, freely rotatable relative to the housing and offset from a housing rotational axis, wherein the valve comprises a centrifugal valve tuned to open at a cracking rotational frequency, wherein the cracking rotational frequency is determined based on a resonant frequency of the eccentric mass.

16. The system of claim 11, wherein the valve comprises an active valve, the system further comprising a control system operably connected to the active valve and mounted to the housing.

17. The system of claim 16, wherein the active valve comprises a solenoid, wherein the control system comprises a processing system mounted to the housing.

18. The system of claim 16, further comprising:
- an electric generator mounted to the housing; and
- a battery mounted to the housing and electrically connected to the electric generator and the active valve.

19. The system of claim 18, wherein the electric generator is driven by a hanging mass rotatably mounted to the housing.

20. The system of claim 11, further comprising a secondary pump fluidly connected to an inlet of the pump, wherein the secondary pump is actuatably connected to the drive mechanism.

* * * * *